US 8,373,893 B2

(12) United States Patent
Inoue et al.

(10) Patent No.: US 8,373,893 B2
(45) Date of Patent: Feb. 12, 2013

(54) IMAGE FORMING APPARATUS, CONTROL DEVICE, COMPUTER READABLE MEDIUM AND COMPUTER DATA SIGNAL

(75) Inventors: Michihiro Inoue, Kanagawa (JP);
Yasukazu Horii, Kanagawa (JP);
Takayoshi Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1610 days.

(21) Appl. No.: 11/826,489

(22) Filed: Jul. 16, 2007

(65) Prior Publication Data
US 2008/0130021 A1 Jun. 5, 2008

(30) Foreign Application Priority Data
Dec. 5, 2006 (JP) ................ P2006-328164

(51) Int. Cl.
*G06F 15/00* (2006.01)
(52) U.S. Cl. .......... 358/1.7; 358/1.3; 358/1.9; 358/1.14; 358/463; 345/48; 345/84; 345/207; 347/142; 347/248; 399/53; 399/119; 399/261
(58) Field of Classification Search .......... 358/1.7, 358/1.3, 1.9, 1.14, 463; 345/48, 84, 207; 347/142, 248; 399/53, 119, 263
See application file for complete search history.

(56) References Cited

U.S. PATENT DOCUMENTS

| | | | |
|---|---|---|---|
| 6,774,893 B2 * | 8/2004 | Debiez et al. | 345/207 |
| 2001/0032323 A1 * | 10/2001 | Takagi et al. | 713/500 |
| 2005/0062831 A1 * | 3/2005 | Ishibashi et al. | 347/142 |
| 2005/0232646 A1 * | 10/2005 | Yoshizuka et al. | 399/27 |

FOREIGN PATENT DOCUMENTS

| | | |
|---|---|---|
| JP | 06-067483 | 3/1994 |
| JP | 2000-181258 | 6/2000 |
| JP | 2002-036628 A | 2/2002 |
| JP | 2002-202673 | 7/2002 |
| JP | 2002-229377 A | 8/2002 |
| JP | 2002-343548 A | 11/2002 |
| JP | 2005-271242 | 10/2005 |
| JP | 2006-084988 | 3/2006 |
| JP | 2006-301071 | 11/2006 |
| JP | 2007-310356 | 11/2007 |

OTHER PUBLICATIONS

Machine translation of Japanese Patent Document No. 2005-271242, Takeshi et al., Oct. 6, 2005.*

* cited by examiner

*Primary Examiner* — David K Moore
*Assistant Examiner* — Mark Milia
(74) *Attorney, Agent, or Firm* — Morgan, Lewis & Bockius LLP

(57) ABSTRACT

An image forming apparatus includes a light emission element, a lighting signal generation section, a storage section, a communication line, a control section and an electromagnetic noise generation source. The storage section stores data used when the lighting signal generation section generates a lighting signal. The lighting signal generation section and the storage section transmit and receive the data therebetween through the communication line. The control section that controls the transmitting and receiving of the data between the lighting signal generation section and the storage section. The control section controls so as to start the transmitting and receiving of the data between the storage section and the lighting signal generation section in a state where a magnitude of the electromagnetic noise, at a position where the lighting signal generation section is disposed, generated by the electromagnetic noise generation source is smaller than a predetermined value.

16 Claims, 14 Drawing Sheets

IMAGE FORMING APPARATUS, CONTROL DEVICE, COMPUTER READABLE MEDIUM AND COMPUTER DATA SIGNAL

CROSS-REFERENCE TO RELATED APPLICATIONS

This application is based on and claims priority under 35 U.S.C. §119 from Japanese Patent Application No. 2006-328164 Dec. 5, 2006.

1. Technical Field

The invention relates to an image forming apparatus such as a printer and a copier.

2. Related Art

In an image forming apparatus such as a printer and a copier, using electrophotography, an exposure device that uses a light emission element array having light emission elements, such as LEDs, arranged in a line has been proposed as an exposure device for exposing an image carrier such as a photoconductor drum.

In the exposure device using the light emission element array, the light emission amount is adjusted for each light emission element to deal with variations in the light emission amount from one light emission element to another, deterioration with time in the sensitivity characteristic of a photoconductor drum. Thus, the exposure device is configured so that data to adjust the light emission amount of each light emission element is input from a storage section for storing the data by conducting data communications at a predetermined timing before start of the image formation operation.

On the other hand, these days, a fixing device of electromagnetic induction heating type capable of shortening the warming-uptime has been proposed. Since the fixing device of electromagnetic induction type is driven with high-frequency current, electromagnetic noise occurs. Such large electromagnetic noise may cause a communication error to occur at the input time of the data to correct the light amount mentioned.

SUMMARY

According to an aspect of the invention, an image forming apparatus includes a light emission element, a lighting signal generation section, a storage section, a communication line, a control section and an electromagnetic noise generation source. The light emission element exposes an image carrier to light. The lighting signal generation section generates a lighting signal for lighting the light emission element. The storage section stores data which is used when the lighting signal generation section generates the lighting signal. The lighting signal generation section and the storage section transmit and receive the data therebetween through the communication line. The control section controls the transmitting and receiving of the data between the lighting signal generation section and the storage section. The electromagnetic noise generation source generates electromagnetic noise. The control section controls so as to start the transmitting and receiving of the data between the storage section and the lighting signal generation section (i) in a state where a magnitude of the electromagnetic noise, at a position where the lighting signal generation section is disposed, generated by the electromagnetic noise generation source is smaller than a predetermined value, or (ii) in a state where a magnitude of the electromagnetic noise, at a position where the communication line is disposed, generated by the electromagnetic noise generation source is smaller than the predetermined value.

As a program, for example, a program stored in a reserved area of a hard disk, a DVD-ROM, etc., may be loaded into RAM for execution. A mode in which the program is executed by CPU in a state where it is previously stored in ROM is also available. Further, if rewritable ROM such as EEPROM is included, after a machine is assembled, only the program may be provided and installed in ROM. To provide the program, a mode in which the program is transmitted to a computer including a data record unit through a network such as the Internet and is installed in ROM included in the data record unit is also possible.

BRIEF DESCRIPTION OF THE DRAWINGS

Exemplary embodiments of the invention will be described below with reference to the accompanying drawings in detail, wherein:

FIG. 14 is a drawing to show change with time in a region where the electromagnetic noise level in the image forming apparatus becomes extremely small after fixing on.

DETAILED DESCRIPTION

Referring now to the accompanying drawings, exemplary embodiments of the invention will be described.

[First Exemplary Embodiment]

Figure 1:
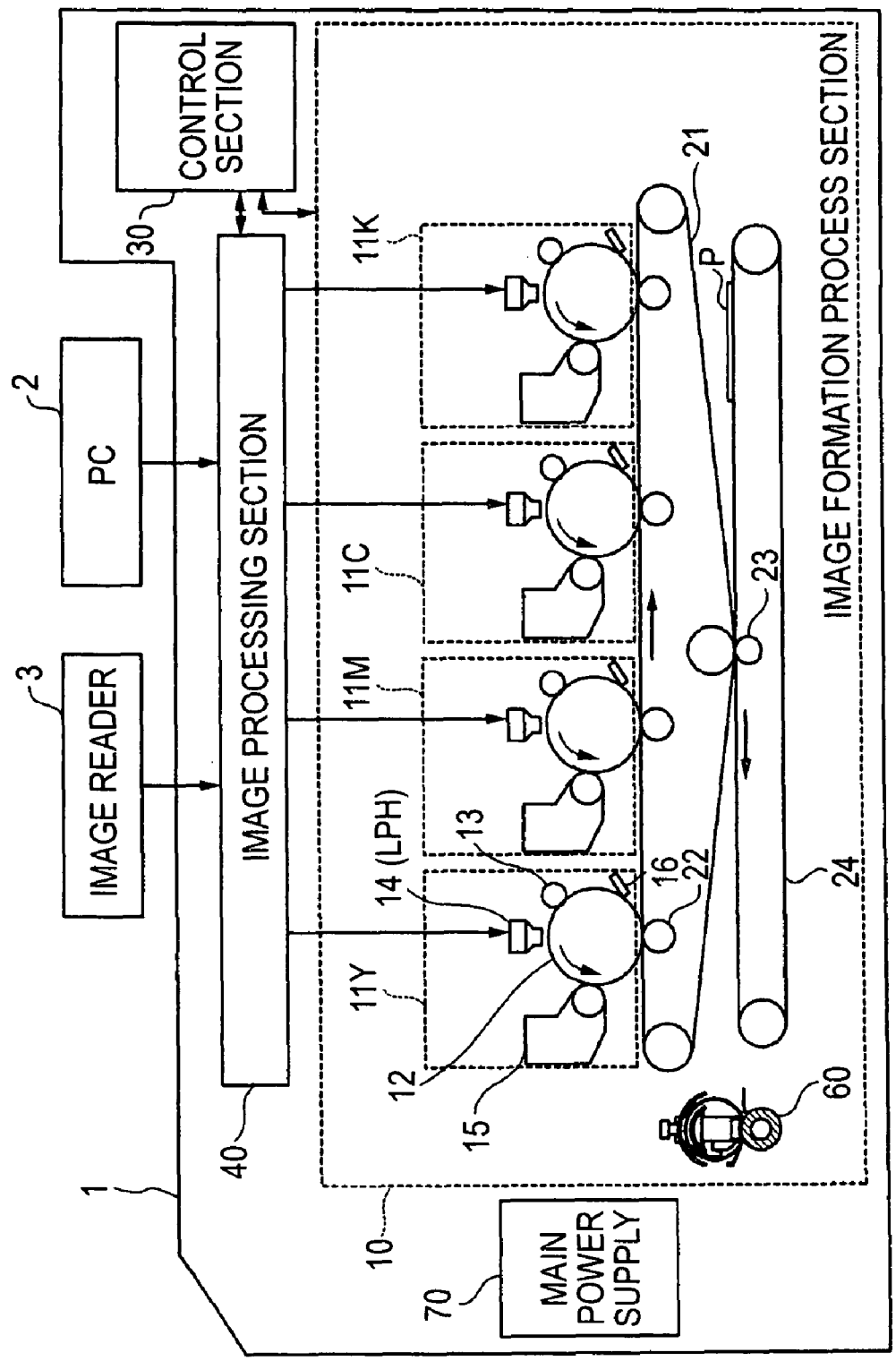
FIG. 1 is a drawing to show the general configuration of an image forming apparatus according to a first exemplary embodiment of the invention.

FIG. 1 is a drawing to show the general configuration of an image forming apparatus 1 according to a first exemplary embodiment. The image forming apparatus 1 shown in FIG. 1 is a tandem digital color printer and includes an image formation process section 10 for executing image formation corresponding to image data of colors, a control section 30 as an example of control section for controlling the operation of sections of the image forming apparatus 1, an image processing section 40 connected to external apparatus, such as a personal computer (PC) 2 and an image reader 3, for performing predetermined image processing for the image data received from the external apparatus, and a main power supply 70 for supplying power to the sections.

The image formation process section 10 includes four image formation units 11Y, 11M, 11C, and 11K (which will be hereinafter also collectively called "image formation unit 11") placed in parallel with a given spacing from each other. Each image formation unit 11 includes a photoconductor drum 12 as an image carrier for forming an electrostatic latent image and supporting a toner image, a charger 13 for uniformly charging the surface of the photoconductor drum 12 at a predetermined potential, an LED print head (LPH) 14 as an example of exposure means for exposing the photoconductor drum 12 charged by the charger 13 based on image data, a developing device 15 for developing the electrostatic latent image formed on the photoconductor drum 12, and a cleaner 16 for cleaning the surface of the photoconductor drum 12 after transfer.

The image formation units 11Y, 11M, 11C, and 11K have each a roughly similar configuration except toner stored in the developing device 15. The image formation units 11Y, 11M, 11C, and 11K form toner images of yellow (Y), magenta (M), cyan (C), and black (K) respectively.

The image formation process section 10 also includes an intermediate transfer belt 21 onto which the color toner images formed on the photoconductor drums 12 of the image formation units 11 are multiply transferred, a primary transfer roll 22 for primarily transferring the color toner images of the image formation units 11 in sequence onto the intermediate transfer belt 21, a secondary transfer roll 23 for secondarily transferring the superposed toner images transferred onto the intermediate transfer belt 21 in batch onto paper P of a record material (record paper), and a fixing device 60 of electromagnetic induction heating type as an example of fixing means for fixing the secondarily transferred image on the paper P.

Figure 2:
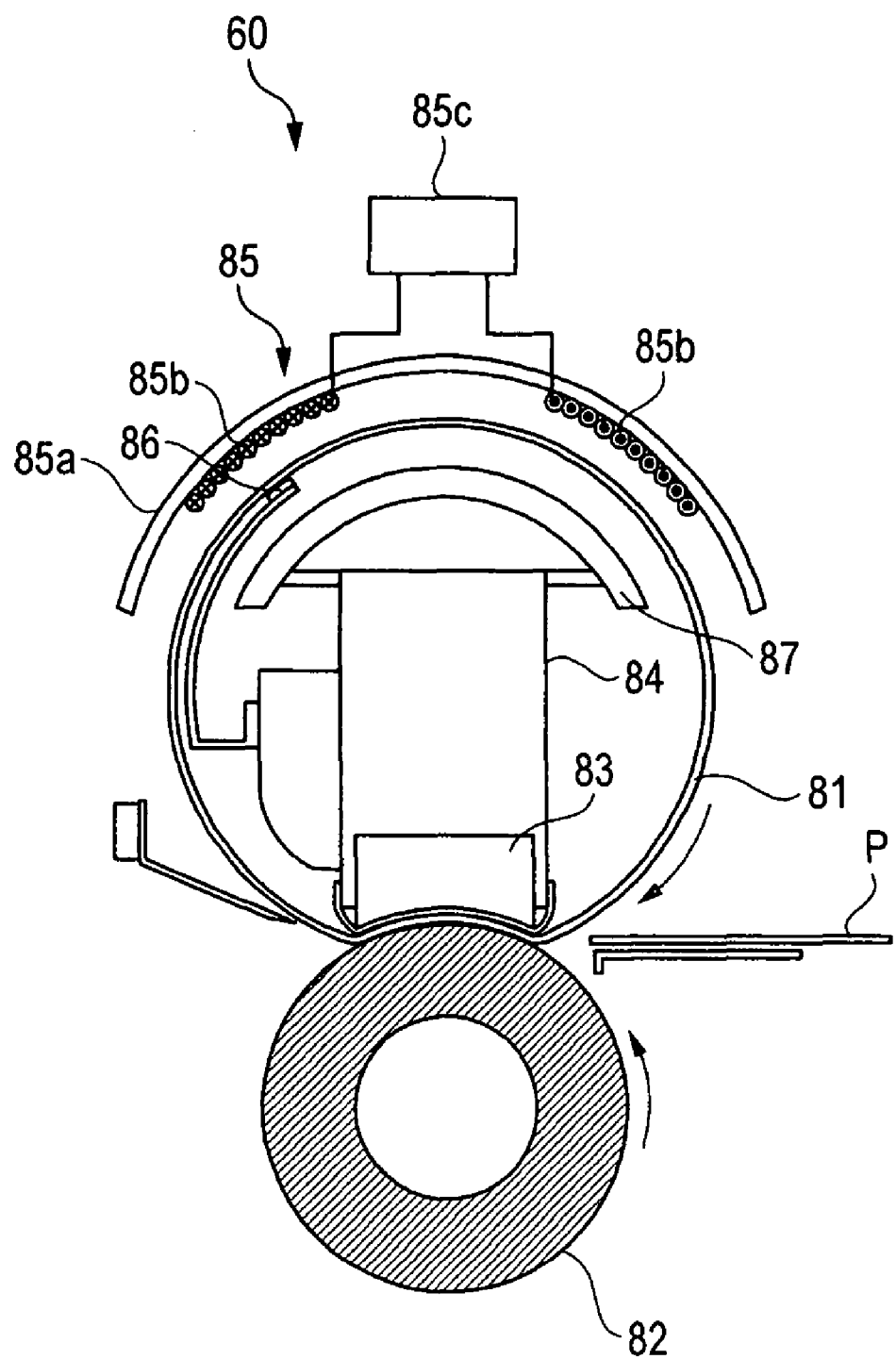
FIG. 2 is a schematic sectional view to show the configuration of a fixing device.

The fixing device 60 has the main part made up of a fixing belt 81 having an endless peripheral surface, a pressurization roll 82 disposed so as to be pressed against the outer peripheral surface of the fixing belt 81 for rotating the fixing belt 81, a press pad 83 placed as to be pressed against the pressurization roll 82 via the fixing belt 81 inside the fixing belt 81, a pad support member 84 for supporting the press pad 83, etc., an electromagnetic induction heating member 85 formed following the outer peripheral surface shape of the fixing belt 81 and disposed with a given spacing from the fixing belt 81 for executing electromagnetic induction heating of the fixing belt 81 over the length direction, and a ferrite member 87 for enhancing the efficiency of heating the fixing belt 81 by the electromagnetic induction heating member 85 as shown in FIG. 2 (schematic sectional view to show the configuration of the fixing device 60).

The fixing belt 81 is formed with a conductive layer made of metal of iron, cobalt, nickel, copper, aluminum, chromium, etc., as a heating layer inductively heated according to a magnetic field induced by the electromagnetic induction heating member 85.

The electromagnetic induction heating member 85 is made up of a pedestal 85a having a curved surface following the outer peripheral surface shape of the fixing belt 81 on the side of the fixing belt 81, exciting coils 85b fixed to the pedestal 85a along the width direction of the fixing belt 81, and an excitation circuit 85c for supplying a high-frequency current. Each exciting coil 85b is formed by more than once winding a litz wire of a bundle of copper wires each having a diameter of 0.5 mm and insulated from each other by heat-resistant insulating material (polyimide resin, polyamideimide resin, etc.), for example, like a closed loop of an oblong figure, an oval figure, a rectangular figure, etc.

In the electromagnetic induction heating member 85, a high-frequency current of 10 to 500 kHz, for example, is supplied from the excitation circuit 85c to the exciting coils 85b. Accordingly, a magnetic flux repeatedly produced and destroyed in the surrounding of the exciting coils 85b crosses the fixing belt 81, whereby a magnetic field to hinder the magnetic field change occurs in the fixing belt 81. Accordingly, an eddy current (I) occurs in the fixing belt 81 and the fixing belt 81 is heated by Joule heat ($W=I^2R$) proportional to skin resistance (R) of the fixing belt 81.

At the time, the control section 30 of the image forming apparatus 1 (see FIG. 1) controls the power amount, the supply time, etc., of the high-frequency current supplied from the excitation circuit 85c based on the measurement value of a temperature sensor 86, thereby maintaining the fixing belt 81 at a predetermined temperature.

In the described image forming apparatus 1 of the exemplary embodiment, the image formation process section 10 performs the image formation operation based on various control signals supplied from the control section 30. That is, the image data input from the PC 2 and the image reader 3 is subjected to image processing by the image processing section 40 and is supplied to the image formation units 11 through an interface (not shown) under the control of the control section 30. For example, in the yellow image formation unit 11Y, the surface of the photoconductor drum 12 uniformly charged at a predetermined potential by the charger 13 is exposed to light by the LPH 14 lighted based on the image data sent from the image processing section 40 and an electrostatic latent image is formed on the photoconductor drum 12. The electrostatic latent image formed on the photoconductor drum 12 is developed by the developing device 15 and a yellow (Y) toner image is formed on the photoconductor drum 12. Likewise, magenta (M), cyan (C), and black (K) color toner images are also formed in the image formation units 11M, 11C, and 11K.

The color toner images formed in the image formation units 11 are electrostatically attracted in sequence onto the intermediate transfer belt 21 moving in the arrow direction in FIG. 1 by the primary transfer roll 22 to form a superposed toner image. The superposed toner image on the intermediate transfer belt 21 is transported to the area in which the secondary transfer roll 23 is disposed (secondary transfer section) as the intermediate transfer belt 21 moves. When the superposed toner image is transported to the secondary transfer section, paper P is supplied to the secondary transfer section conforming to the timing at which the toner image is transported to the secondary transfer section. The superposed toner image is electrostatically transferred in batch onto the transported paper P according to a transfer electric field formed by the secondary transfer roll 23 in the secondary transfer section.

Then, the paper P onto which the superposed toner image is electrostatically transferred is stripped off from the intermediate transfer belt 21 and is transported to the fixing device 60 over a transport belt 24. The unfixed toner image on the paper P transported to the fixing device 60 is fixed on the paper P as it undergoes fixing treatment using heat and pressure by the fixing device 60. The paper P formed with the fixed image is transported to an ejected paper placement section (not shown) provided in an ejection section of the image forming apparatus 1.

Figure 3:
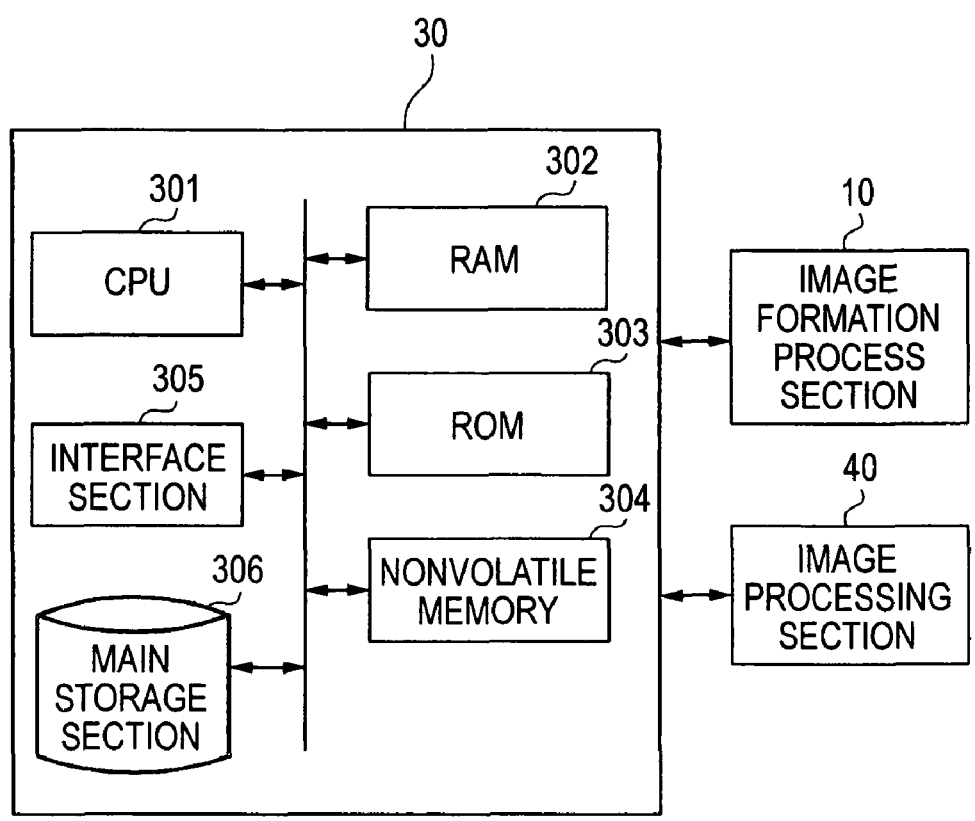
FIG. 3 is a block diagram to show the internal configuration of a control section.

FIG. 3 is a block diagram to show the internal configuration of the control section 30 of the exemplary embodiment. As shown in the figure, the control section 30 includes a CPU 301 for executing digital computation processing in accordance with a predetermined processing program in controlling the operation of the sections, data communications, etc., RAM 302 used as work memory of the CPU 301, etc., ROM 303 storing processing programs, etc., executed by the CPU 301, nonvolatile memory 304 as an example of rewritable storage section such as SRAM or flash memory capable of retaining data if power supply stops, and an interface section 305 for controlling input/output of signals from/to the sections such as the image formation process section 10 and the image processing section 40 connected to the control section 30.

The processing programs executed by the control section 30 are stored in a main storage section 306. When the image forming apparatus 1 is started up, the control section 30 reads the processing program, whereby it executes operation control, data communication control, etc., in the exemplary embodiment.

Figure 4:
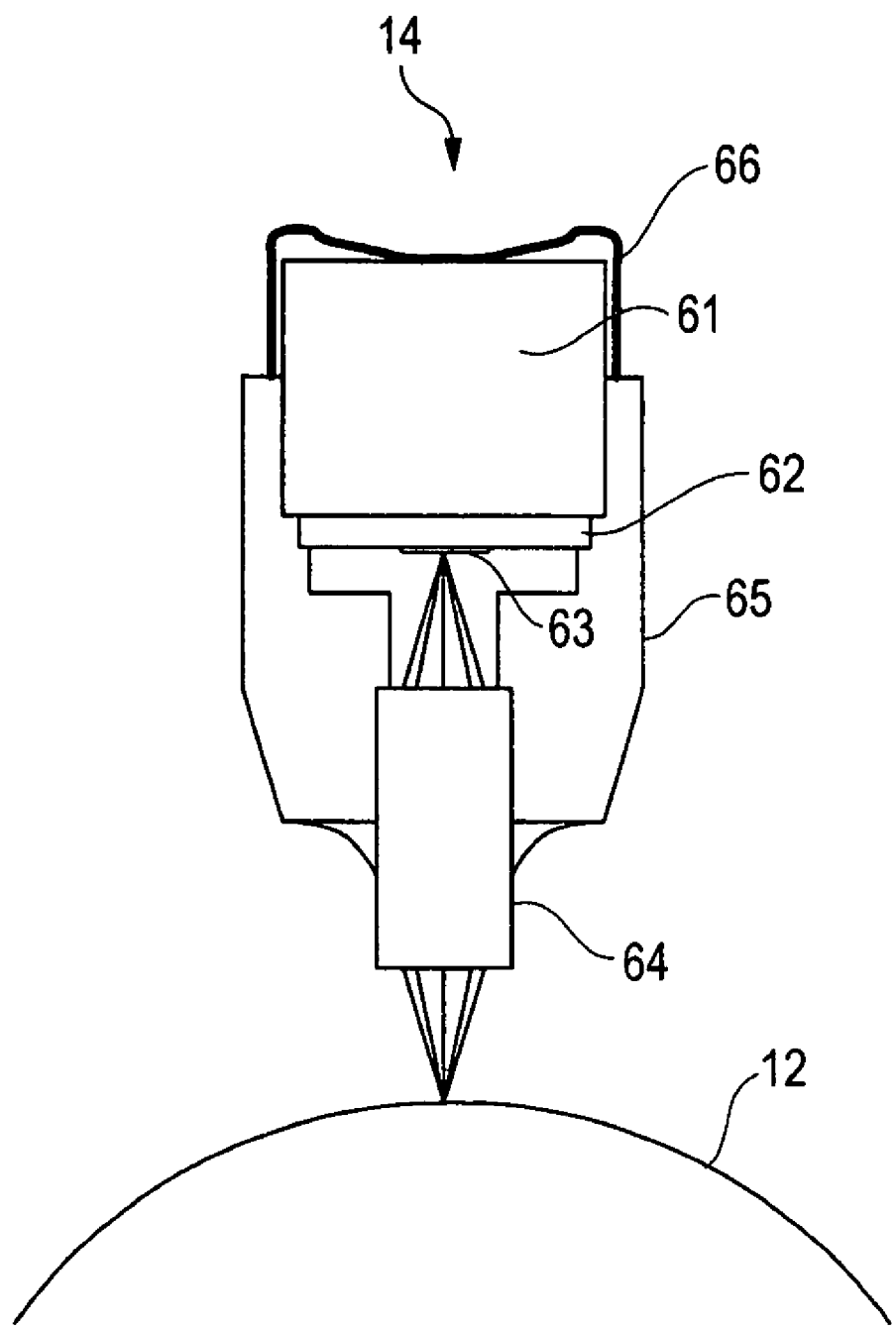
FIG. 4 is a sectional view to show the configuration of an LED print head (LPH)

Next, FIG. 4 is a sectional view to show the configuration of the LED print head (LPH) 14 of an exposure device. In the figure, the LPH 14 includes a housing 61 as a support, a self-scan LED array (SLED) 63 as an example of a light emission element member, an LED circuit board 62 installing the SLED 63, a signal generation circuit 100 as an example of lighting signal generation section for generating a drive signal for driving the SLED 63, and the like, a rod lens array 64 as an example of an optical member for forming an image of light from the SLED 63 on the surface of the photoconductor drum 12, a holder 65 for supporting the rod lens array 64 and shielding the SLED 63 from the outside, and a plate spring 66 for pressurizing the housing 61 in the direction of the rod lens array 64.

The housing 61 is formed of a metal block or sheet metal of aluminum, stainless steel, etc., for supporting the LED circuit board 62. The holder 65 supports the housing 61 and the rod lens array 64 and is set so that the light emission point of the SLED 63 and the focal surface of the rod lens array 64 match. Further, the holder 65 is formed so as to hermetically seal the SLED 63, thereby preventing dust from being deposited on the SLED 63 from the outside. On the other hand, the plate spring 66 pressurizes the LED circuit board 62 through the housing 61 in the direction of the rod lens array 64 so as to hold the positional relationship between the SLED 63 and the rod lens array 64.

The described LPH 14 can be moved in the optical axis direction of the rod lens array 64 with an adjustment screw (not shown) and is adjusted so that the image formation position (focal surface) of the rod lens array 64 is positioned on the surface of the photoconductor drum 12.

Figure 5:
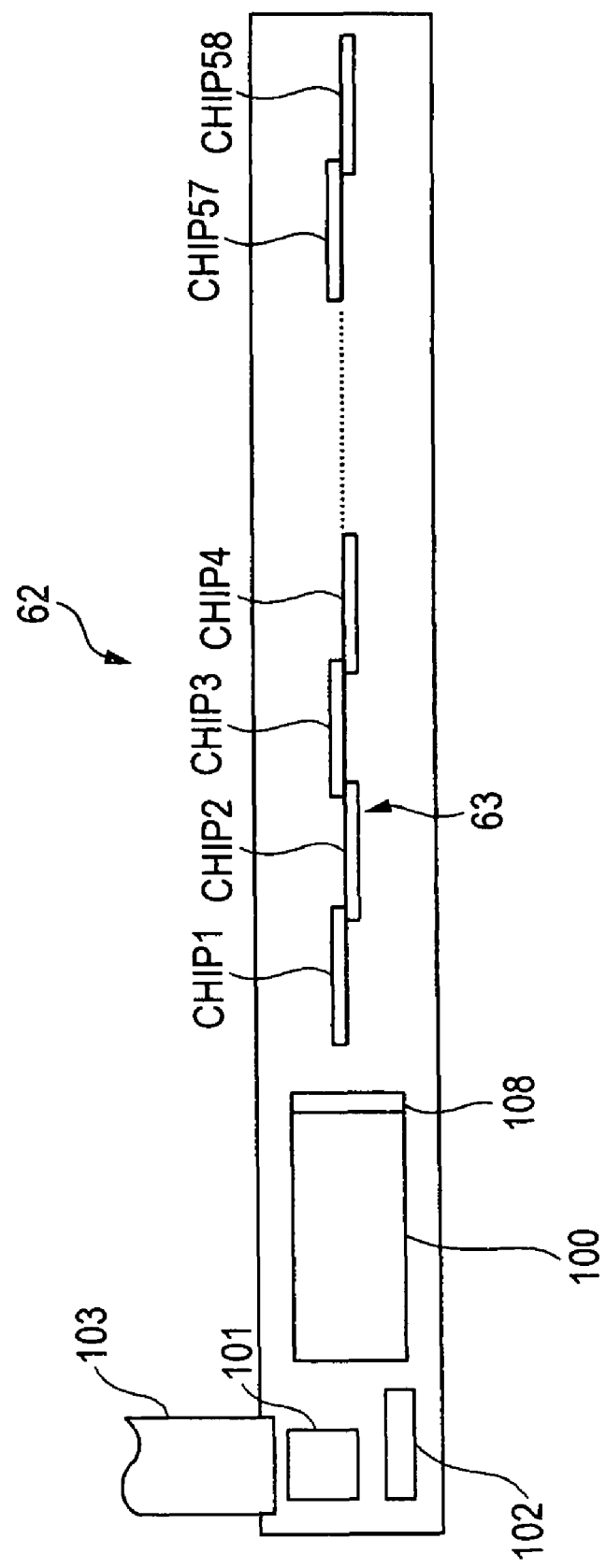
FIG. 5 is a plan view of an LED circuit board.

The SLED 63 made up of 58 SLED chips (CHIP1 to CHIP58), for example, is placed on the LED circuit board 62 like a line with accuracy so as to become parallel with the axial direction of the photoconductor drum 12, as shown in FIG. 5 (plan view of the LED circuit board 62). In this case, the SLED chips are placed as a staggered arrangement so that the LED arrays are continuously arranged at SLED chip joint parts on the end boundaries between the arrays of the light emission elements (LEDs) (LED arrays) placed on the SLED chips (CHIP1 to CHIP58).

The LED circuit board 62 includes the signal generation circuit 100 and a level shift circuit 108 for generating a signal for driving the SLED 63 (drive signal), a three-terminal regulator 101 for outputting a predetermined voltage, EEPROM 102 as an example of storage section (storage unit) for storing light amount correction data, etc., used when the light amount of each LED of the SLED 63 is corrected, and a harness 103 as an example of a communication line for transmitting and receiving control signals, data signals, etc., between the control section 30 and the image processing section 40 and receiving power supply from the main power supply 70.

Figure 6:
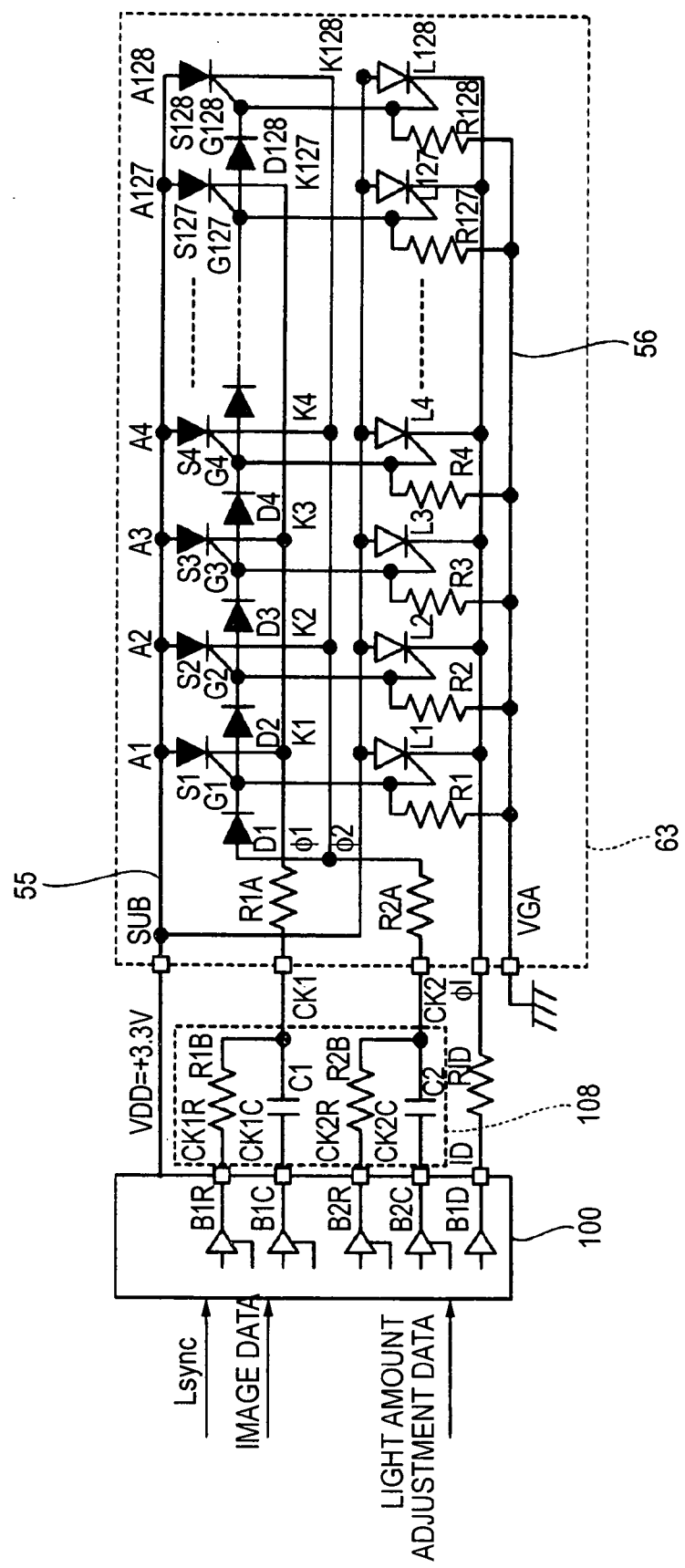
FIG. 6 is a drawing to describe an SLED.

FIG. 6 is a drawing to describe the SLED 63. Various drive signals are supplied to the SLED 63 in the exemplary embodiment from the signal generation circuit 100 and the level shift circuit 108. That is, the signal generation circuit 100 generates transfer signals CK1R and CK1C and transfer signals CK2R and CK2C for setting the LEDs placed in the SLED 63 to a light-possible state in sequence along the arrangement of the LEDs and a lighting signal ΦI for lighting the LEDs in sequence based on image data from the image processing section 40. The signal generation circuit 100 outputs the transfer signals CK1R and CK1C and the transfer signals CK2R and CK2C to the level shift circuit 108 and outputs the lighting signal ΦI to the SLED 63.

The level shift circuit 108 has a resistor R1B and a capacitor C1 and a resistor R2B and a capacitor C2 placed in parallel and one ends of the components are connected to input terminals of the SLED 63 and opposite ends are connected to output terminals of the signal generation circuit 100. The level shift circuit 108 generates a transfer signal CK1 and a transfer signal CK2 based on the transfer signals CK1R and CK1C and the transfer signals CK2R and CK2C output from the signal generation circuit 100 and outputs the transfer signal CK1 and the transfer signal CK2 to the SLED 63.

The SLED 63 has main components of 128 thyristors S1 to S128 as switch elements, 128 LEDs L1 to L128 as light emission elements, 128 diodes D1 to D128, 128 resistors R1 to R128, and transfer current limiting resistors R1A and R2A for preventing an excessive current from flowing into signal line Φ1, Φ2, for example.

Anode terminals (input terminals) A1 to A128 of the thyristors S1 to S128 are connected to a power supply line 55 and drive voltage VDD (VDD=+3.3 V) is supplied from the three-terminal regulator 101 (see FIG. 5) via the power supply line 55. On the other hand, gate terminals (control terminals) G1 to G128 of the thyristors S1 to S128 are connected to a power supply line 56 through the resistors R1 to R128 provided in a one-to-one correspondence with the thyristors S1 to S128 and are grounded (GND) via the power supply line 56.

The transfer signal CK1 from the signal generation circuit 100 and the level shift circuit 108 is transmitted through the transfer current limiting resistor R1A to cathode terminals (output terminals) K1, K3, ..., K127 of the odd-numbered thyristors S1, S3, ..., S127. The transfer signal CK2 from the signal generation circuit 100 and the level shift circuit 108 is transmitted through the transfer current limiting resistor R2A to cathode terminals (output terminals) K2, K4, ..., K128 of the even-numbered thyristors S2, S4, S128.

Further, cathode terminals of the LEDs L1 to L128 are connected to the signal generation circuit 100 and the lighting signal ΦI is transmitted.

The signal generation circuit 100 of the exemplary embodiment sets the transfer signal CK1R, CK1C and the transfer signal CK2R, CK2C from high level (H) to low level (L) and from L to H at a predetermined timing. Accordingly, the level shift circuit 108 repeatedly sets the potential of the transfer signal CK1 from H to L and from L to H and repeatedly sets the potential of the transfer signal CK2 from H to L and from L to H alternately. The transfer signal CK1 and the transfer signal CK2 are supplied to each SLED chip. In each SLED chip, the odd-numbered thyristors S1, S3, ..., S127 perform transfer operation of off to on to off in sequence according to the transfer signal CK1 and the transfer signal CK2. The even-numbered thyristors S2, S4, ..., S128 perform transfer operation of off to on to off in sequence alternately. Accordingly, the thyristors S1 to S128 perform transfer operation of off to on to off in sequence in the order of S1 to S2, . . . , S127 to S128 and the signal generation circuit 100 outputs the lighting signal ΦI in synchronization with the operation. Accordingly, the LEDs L1 to L128 are lighted in sequence in the order of L1 to L2, . . . , L127 to L128.

Thus, in the LPH 14 of the exemplary embodiment, in all SLED chips (CHIP1 to CHIP58) disposed on the LED circuit board 62, the LEDs L1 to L128 are lighted in sequence in the order of L1 to L2, . . . , L127 to L128 for scanning over the photoconductor drum 12 as exposure based on the image data.

At the time, the light emission amounts of the LEDs L1 to L128 in all SLED chips (CHIP1 to CHIP58) are adjusted for each LED so as to deal with variations in the light emission amount from one LED to another, aged deterioration of the sensitivity characteristic of the photoconductor drum 12, etc.

Subsequently, the signal generation circuit 100 provided on the LED circuit board 62 will be described.

Figure 7:
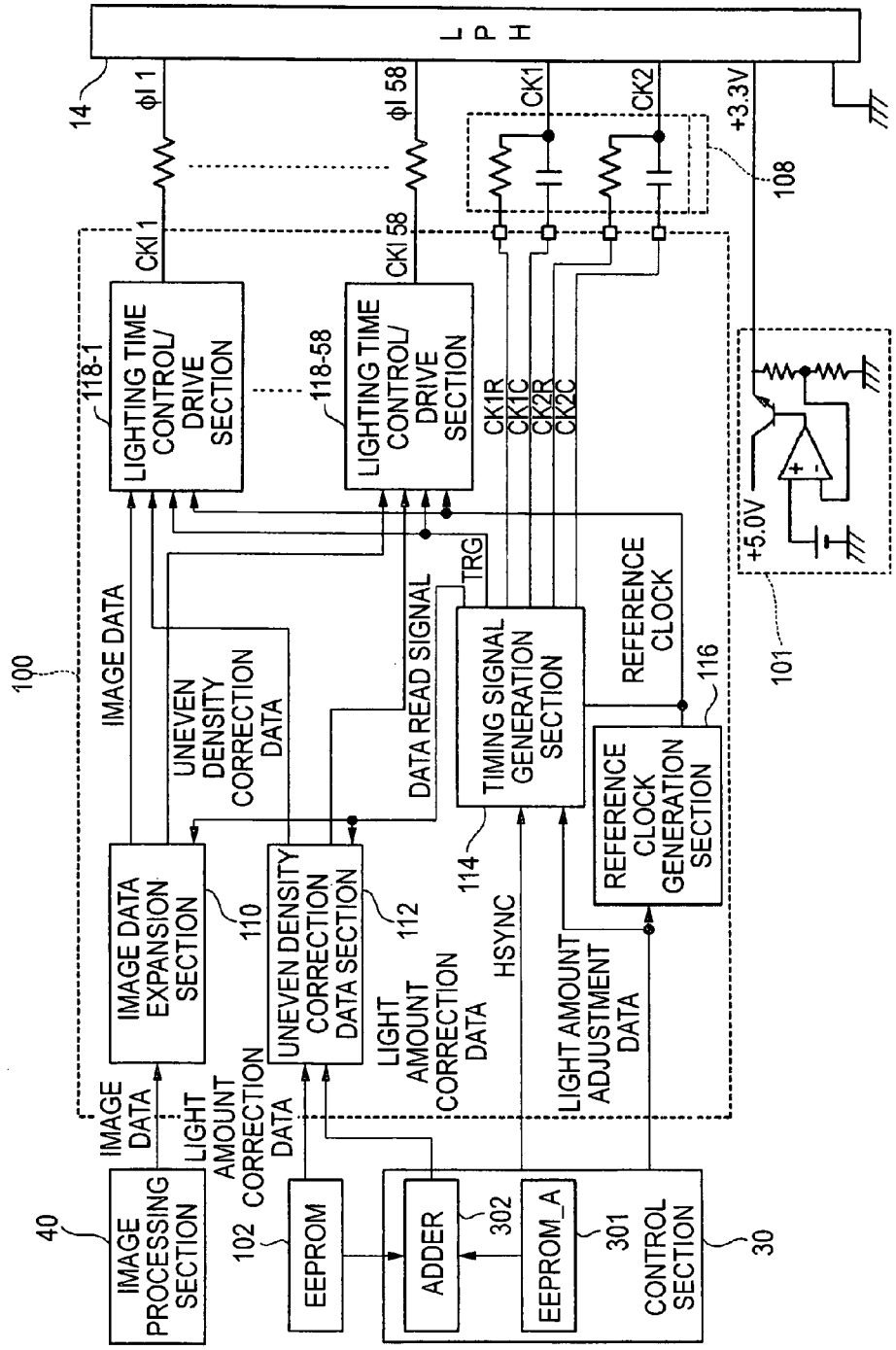
FIG. 7 is a block diagram to show the configuration of a signal generation circuit.

FIG. 7 is a block diagram to show the configuration of the signal generation circuit 100. The signal generation circuit 100 has a main part including an image data expansion section 110, an uneven density correction data section 112, a timing signal generation section 114, a reference clock generation section 116, and lighting time control/drive sections 118-1 to 118-58 provided in a one-to-one correspondence with the SLED chips (CHIP1 to CHIP58).

Image data is serially transmitted to the image data expansion section 110 from the image processing section 40. The image data expansion section 110 divides the received image data into image data of the 1st to 128th dots, image data of the 129th to 256th dots, . . . , image data of the 7297th to 7424th dots corresponding to the SLED chips (CHIP1 to CHIP58). The image data obtained by the dividing is output to the respective lighting time control/drive sections 118-1 to 118-58 connected thereto.

The uneven density correction data section 112 stores uneven density correction data Corr to correct image density unevenness at the image formation time, caused by variations in the light emission amount from one LED to another in the SLED 63, change with time in the image formation condition, etc. The uneven density correction data section 112 outputs the uneven density correction data Corr to the lighting time control/drive sections 118-1 to 118-58 in synchronization with a data read signal from the timing signal generation section 114. The uneven density correction data Corr is set for each LED and is multibit (for example, eight-bit) data.

The EEPROM 102 stores light amount correction data for each LED to correct variations in the light emission amount among the light emission elements (LED L1 to L128) of the LPH 14. The variations in the light emission amount are unique to the respective light emission elements (LED L1 to L128). The light amount correction data for each LED is set based on the measurement value of the light emission amount of the LPH 14 at shipment time. In other words, the EEPROM 102 stores initial light amount correction data (first light amount correction data) Corr_1. On the other hand, the control section 30 of the main body is provided with EEPROM_A 301 that stores light amount correction data for each LED to correct unevenness in a potential of an electrostatic latent image caused by factors other than the exposure step of the LPH 14 of the image forming apparatus 1, for example, a factor unique to the photoconductor drum 12 and a factor relating to change in the image formation condition such as change with time in sensitivity characteristic of the photoconductor drum 12 with lapse of the operation time of the image forming apparatus 1. In other words, the EEPROM_A 301 stores process light amount correction data (second light amount correction data) Corr_2.

When power of the image forming apparatus 1 is turned on, the initial light amount correction data Corr_1 for each LED is downloaded from the EEPROM 102 to the uneven density correction data section 112 and the control section 30 by data communication under the control of the control section 30. At the initial operation time after factory shipment of the image forming apparatus 1, the initial light amount correction data Corr_1 is stored in the uneven density correction data section 112 as uneven density correction data Corr.

When the operation time of the image forming apparatus 1 exceeds a predetermined time, the control section 30 adds the initial light amount correction data Corr_1 acquired from the EEPROM 102 and the process light amount correction data Corr_2 stored in the EEPROM_A 301 by an adder 302 to generate light amount correction data Corr_3 responsive to the operation time of the image forming apparatus 1. The control section 30 transmits the generated light amount correction data Corr_3 to the uneven density correction data section 112. The light amount correction data Corr_3 is stored in the uneven density correction data section 112 as the uneven density correction data Corr.

The initial light amount correction data Corr_1 stored in the EEPROM 102 is light amount correction data for each LED, which is calculated based on a light amount distribution obtained by measuring an exposure energy distribution (light amount distribution) of the LPH 14 at the time of manufacturing the LPH 14.

The process light amount correction data Corr_2 stored in the EEPROM_A 301 is light amount correction data for each LED provided by reading the density of a test pattern through the image reader 3 in operation of the image forming apparatus 1 every time when a predetermined interval elapses. That is, image density data of the test pattern image of each color is read through the image reader 3 and a density distribution in the main scanning direction on the image density data is found from the read image density data. Such light amount correction data for each LED to suppress unevenness in density in the main scanning direction is calculated based on the obtained density distribution and is set as the process light amount correction data Corr_2.

The reference clock generation section 116 generates a reference clock signal. The timing signal generation section 114 synchronizes a horizontal synchronizing signal (HSYNC) from the control section 30 based on the reference clock signal generated by the reference clock generation section 116 to generate the transfer signals CK1R and CK1C and the transfer signals CK2R and CK2C. The timing signal generation section 114 also generates and outputs a data read signal for reading the image data corresponding to each pixel from the image data expansion section 110, a data read signal for reading the uneven density correction data Corr corresponding to each LED from the uneven density correction data section 112, and a trigger signal (TRG) for starting to light the SLED 63.

Next, each of the lighting time control/drive sections 118-1 to 118-58 corrects the lighting time of each LED based on the uneven density correction data Corr and generates a lighting signal (ΦI to light each LED of the SLED 63 (ΦI1 to ΦI58).

Figure 8:
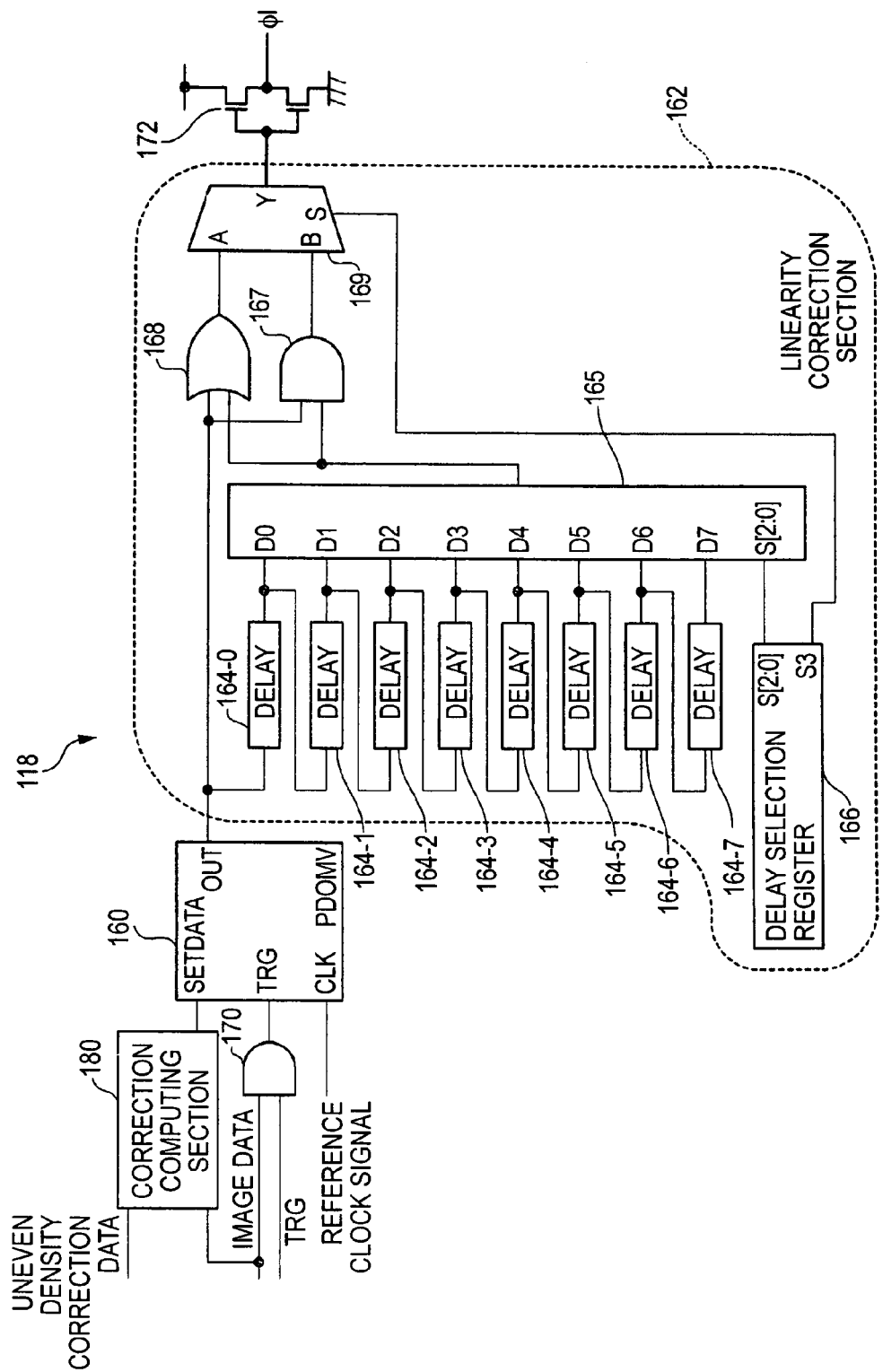
FIG. 8 is a block diagram to describe the configuration of a lighting time control/drive section.

Specifically, each of the lighting time control/drive sections 118-1 to 118-58 is made up of a presentable digital one shot multivibrator (PDOMV) 160, a linearity correction section 162, an AND circuit 170, and a correction computing section 180 as shown in FIG. 8 (block diagram to describe the configuration of the lighting time control/drive section 118). The AND circuit 170 is connected to the image data expansion section 110 and the timing signal generation section 114. If the image data from the image data expansion section 110 is "1" (ON), the AND circuit 170 outputs the trigger signal (TRG) from the timing signal generation section 114 to the PDOMV 160; if the image data is "0" (OFF), the AND circuit 170 does not output the trigger signal (TRG).

The uneven density correction data Corr and the image data are input to the correction computing section 180, which then generates a data signal representing the uneven density correction amount calculated based on the uneven density correction data Corr and a quantization error (described later) carried over from a nearby pixel. The correction computing section 180 outputs the generated data signal to the PDOMV 160 (SETDATA terminal).

In the correction computing section 180 of the exemplary embodiment, the correction precision is set to four bits (0 to 15) and a correction is made based on the correction amount corresponding to the high-order four bits of the eight-bit uneven density correction data Corr about each pixel. The correction amount of a resolution higher than the correction resolution, namely, the correction amount of the remaining low-order four bits (called "quantization error") is handled as the correction amount carried over to a nearby pixel (described later).

The PDOMV 160 is connected to the AND circuit 170, the correction computing section 180, the reference clock generation section 116, and the linearity correction section 162 and generates a lighting pulse signal of the number of clocks responsive to the data signal output from the correction computing section 180 in synchronization with the trigger signal (TRG) from the AND circuit 170.

The linearity correction section 162 corrects and outputs the lighting pulse signal from the PDOMV 160 to correct variations in the light emission start time in each LED in the SLED 63. Specifically, the linearity correction section 162 is made up of a plurality of delay circuits 164 (in the exemplary embodiment, eight delay circuits 164-0 to 164-7), a delay signal selection section 165, a delay selection register 166, an AND circuit 167, an OR circuit 168, and a lighting signal selection section 169. The delay circuits 164-0 to 164-7 are connected to the PDOMV 160 and are set to different times to delay the lighting pulse signal from the PDOMV 160. The delay selection register 166 is connected to the delay signal selection section 165 and the lighting signal selection section 169, and stores delay selection data and lighting signal selection data for each LED in the SLED 63. The delay selection data and the lighting signal selection data for each LED are previously measured and are stored in the EEPROM 102. The delay selection data and the lighting signal selection data stored in the EEPROM 102 are downloaded to the delay selection register 166 by executing data communications when power of the image forming apparatus 1 is turned on. Flash ROM can also be used as storage section, in which case the flash ROM can also be caused to function as the delay selection register 166.

The delay signal selection section 165 is connected to the AND circuit 167 and the OR circuit 168 and selects any one of outputs from the delay circuits 164-0 to 164-7 based on the delay selection data stored in the delay selection register 166. The AND circuit 167 ANDs the lighting pulse signal from the PDOMV 160 and the delayed lighting pulse signal selected by the delay signal selection section 165 and outputs a lighting pulse if both the pre-delayed lighting pulse signal and the post-delayed lighting pulse signal are on. The OR circuit 168 ORs the lighting pulse signal from the PDOMV 160 and the delayed lighting pulse signal selected by the delay signal selection section 165 and outputs a lighting pulse if at least either of the pre-delayed lighting pulse signal and the post-delayed lighting pulse signal is on.

The lighting signal selection section 169 selects either output from the AND circuit 167 or output from the OR circuit 168 based on the lighting selection data stored in the delay selection register 166. The selected lighting pulse signal is output through MOSFET 172 to the LPH 14 as the lighting signal ΦI.

As shown in FIG. 7, the three-terminal regulator 101 is connected to the LPH 14 for supplying stable +3.3-V voltage from the three-terminal regulator 101 to the LPH 14.

The correction computing section 180 placed in each of the lighting time control/drive sections 118-1 to 118-58 of the exemplary embodiment will be described.

Figure 9:
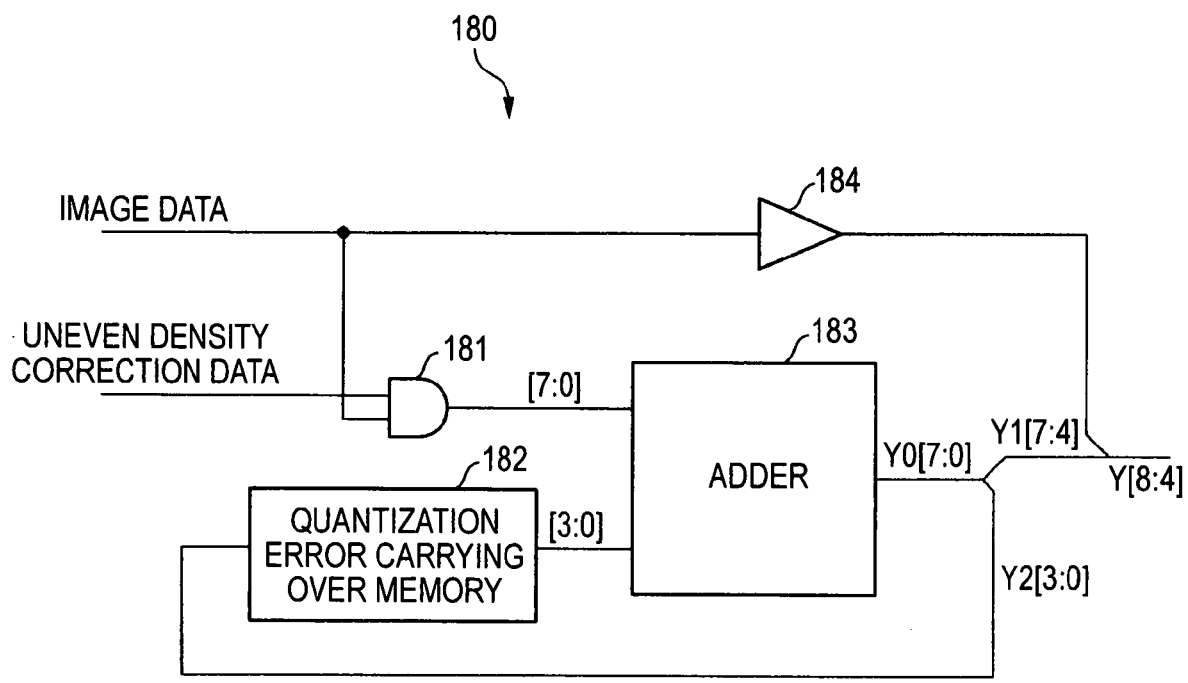
FIG. 9 is a block diagram to describe the configuration of a correction computing section.

The correction computing section 180 of the exemplary embodiment is made up of an AND circuit 181, a quantization error carrying over memory 182, an adder 183, and a buffer 184 as shown in FIG. 9 (block diagram to describe the configuration of the correction computing section 180). In the description to follow, the bits of a data signal input to each section is represented as [n:m]. That is, for example, [7:0] means a signal of bits 0 to 7.

In the correction computing section 180, the input uneven density correction data Corr is sent to the AND circuit 181. The input image data is sent to the AND circuit 181 and the buffer 184. The AND circuit 181 ANDs the input eight-bit uneven density correction data Corr and the input one-bit image data and outputs an eight-bit data signal [7:0] as the computation result. That is, if the image data is "1" (ON), the value of the uneven density correction data Corr is generated as the computation result; if the image data is "0" (OFF), "0" is generated as the computation result. The data signal [7:0] is input to the adder 183 at the following stage.

The data signal [7:0] from the AND circuit 181 and the four-bit quantization error data [3:0] representing the carried-over quantization error from the quantization error carrying over memory 182 are input to the adder 183, which then adds the data signals input from the AND circuit 181 and the quantization error carrying over memory 182 to generate an eight-bit data signal Y0 [7:0] as the computation result.

The adder 183 generates the eight-bit data signal Y0 [7:0] as a data signal Y1 of the high-order four bits [7:4] and a data signal Y2 of the low-order four bits [3:0]. The high-order four-bit data signal Y1 [7:4] and the low-order four-bit data signal Y2 [3:0] are output separately to a signal line for the data signal Y1 [7:4] and a signal line for the data signal Y2 [3:0]. The signal line for the data signal Y1 [7:4] is merged with a signal line of a data signal representing the one-bit image data output at the proper timing by the buffer 184 and the image data is combined with the data signal Y1 [7:4] as the fifth bit of the most significant bit to generate a data signal Y [8:4]. This generated data signal Y [8:4] is output from the correction computing section 180 as new uneven density correction data Corr_M. That is, the high-order one bit of the five-bit data signal Y [8:4] represents the image data and the low-order four bits represent the uneven density correction data Corr_M calculated based on the uneven density correction data and the quantization error carried over from the nearby pixel.

On the other hand, the signal line for the low-order four-bit data signal Y2 [3:0] is connected to the quantization error carrying over memory 182 and the data signal Y2 [3:0], namely, the quantization error is stored in the quantization error carrying over memory 182 as the carry-over amount to the nearby pixel.

Carrying over the data signal Y2 [3:0] to the nearby pixel can be determined by address control when data is input/ output to/from the quantization error carrying over memory 182. That is, when a lighting signal ΦI to light each LED of the SLED 63 of the LPH 14 is generated, the correction computing section 180 determines the access address to the quantization error carrying over memory 182 (address control). The quantization error carried over relative to the LED to be lighted is read from the quantization error carrying over memory 182, and the uneven density correction data Corr_M (the low-order four bits of Y [8:4]) to correct the lighting pulse width of the LED to be lighted is generated based on the uneven density correction data Corr and the quantization error.

In this case, the resolution of the eight-bit uneven density correction data Corr is higher than the four-bit correction resolution of the correction computing section 180 and thus the remaining quantization error resulting from incomplete correction of the correction computing section 180 in correcting the lighting pulse width is stored in the quantization error carrying over memory 182 as the quantization error to be carried over to the nearby LED.

Thus, in the LPH 14 of the exemplary embodiment, although the four-bit correction resolution of the correction computing section 180 is smaller than the eight-bit resolution of the uneven density correction data Corr, the error resulting from incomplete correction is carried over to the nearby LED as the quantization error and light amount correction is made based thereon. Thus, it is made possible to make highly precise light amount correction maintaining the resolution of the uneven density correction data Corr for each region of the LED to which the quantization error is carried over.

Subsequently, the PDOMV 160 generates a lighting pulse signal of the number of clocks corrected in response to the uneven density correction data Corr_M generated by the correction computing section 180 in synchronization with the trigger signal (TRG) from the AND circuit 170 and outputs the lighting pulse signal to the linearity correction section 162, which then makes an offset correction based on delay selection data Offset.

Specifically, each of the lighting time control/drive sections 118-1 to 118-58 of the exemplary embodiment sets the lighting pulse width of each LED based on the uneven density correction data Corr_M and the delay selection data Offset as shown in the following expression [1], thereby roughly matching the light amount characteristic in the lighting pulse width region used with the image forming apparatus 1 with the target light amount characteristic and outputs to the LPH 14:

Lighting pulse width=BASE·(1+Corr_M/128)+Offset [1]

In expression [1], the first term "BASE" is the reference pulse width as the reference for setting the light amount of LED. In the exemplary embodiment, the uneven density correction data Corr_M is made up of the high-order four bits of the eight-bit uneven density correction data Corr (0 to 255) and therefore the case where the light amount correction width concerning the uneven density correction is set to maximum correction value/minimum correction value=3 is shown in expression [1].

The lighting pulse width is thus set according to expression [1], whereby the light amount characteristic in the lighting pulse width region used with the image forming apparatus 1 roughly matches the target light amount characteristic and the light amount of the LED in the use pulse width area is set so as to fall within a predetermined range.

On the other hand, the quantization error is once stored in the quantization error carrying over memory 182, but is carried over to the nearby LED as described above.

Figure 10:
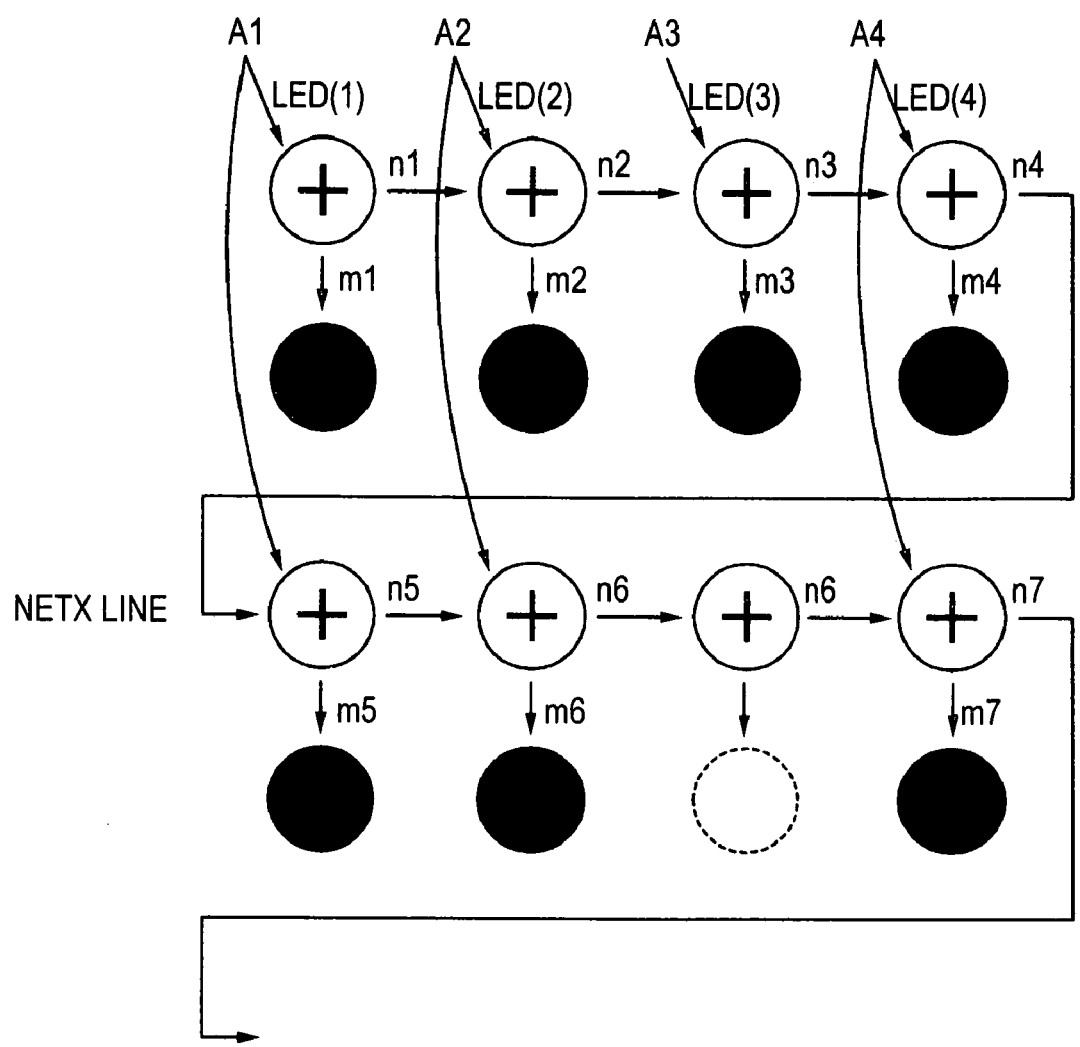
FIG. 10 is a drawing to show an example of a mode in which a quantization error is carried over to a nearby LED.

FIG. 10 is a drawing to show an example of the mode in which the quantization error is carried over to the nearby LED. In the figure, the LEDs arranged in the main scanning direction in the SLED 63 of the LPH 14 are LED (1), LED (2), LED (3), LED (4), ... in order and the correction values to the LED (1), LED (2), LED (3), LED (4), ... determined based on the uneven density correction data Corr from the uneven density correction data section 112 are A1, A2, A3, A4, ...

In the LPH 14 of the exemplary embodiment, address control is performed so that the quantization error is carried over between the adjacent LEDs, namely, between the LEDs (1) and (2), between the LEDs (2) and (3), between the LEDs (3) and (4), and between the LEDs (4) and (1). At this time, first the LED (1) is lighted (image data is set to "1"). In the LED (1), the lighting pulse width is corrected according to the first term of expression [1] mentioned above based on an integer part m1 of the correction value A1 (corresponding to the high-order four bits of A1); on the other hand, a fractional part n1 (corresponding to the low-order four bits of A1) is carried over to the adjacent LED (2) as a quantization error. At the termination of lighting the LED (1), the LED (2) is lighted. In the LED (2), the correction value A2 and n1 carried over from the LED (1) are added and the lighting pulse width is corrected according to the first term of expression [1] mentioned above based on an integer part m2 of the addition result; on the other hand, a fractional part n2 of the addition result is carried over to the adjacent LED (3) as a quantization error.

Likewise, at the termination of lighting the LED (2), the LED (3) is lighted. In the LED (3), the correction value A3 and n2 carried over from the LED (2) are added and the lighting pulse width is corrected according to the first term of expression [1] mentioned above based on an integer part m3 of the addition result; on the other hand, a fractional part n3 of the addition result is carried over to the adjacent LED (4) as a quantization error. At the termination of lighting the LED (3), in the following LED (4), the correction value A4 and n3 carried over from the LED (3) are added and the lighting pulse width is corrected according to the first term of expression [1] mentioned above based on an integer part m4 of the addition result; on the other hand, a fractional part n4 of the addition result is carried over as a quantization error when the adjacent LED (1) is next lighted, namely, when the LED (1) is lighted on the next line.

While the quantization error is carried over between the adjacent LEDs in the main scanning direction, for example, the LEDs (1) to (4), the lighting pulse width is corrected, lighting the LEDs in one line terminates in each SLED chip (CHIP1 to CHIP58) of the SLED 63, and forming a one-line image is complete. Then, lighting the LEDs to form an image of the next line is started. In the line, first the LED (1) is lighted. In the LED (1), the correction value A1 and n4 carried over from the LED (4) at the preceding line lighting time are added and the lighting pulse width is corrected according to the first term of expression [1] mentioned above based on an integer part m5 of the addition result. On the other hand, a fractional part n5 is carried over to the adjacent LED (2) as a quantization error. At the termination of lighting the LED (1), the LED (2) is lighted. In the LED (2), the correction value A2 and n5 carried over from the LED (1) are added and the lighting pulse width is corrected according to the first term of expression [1] mentioned above based on an integer part m6 of the addition result; on the other hand, a fractional part n6 of the addition result is carried over to the adjacent LED (3) as a quantization error.

If the image data is "0" (OFF) in the next LED (3), the correction value A3 is not input and the integer part is not represented by only the fractional part n6 carried over from the LED (2). Thus, the LED (3) is not lighted and the fractional part n6 is carried over to the adjacent LED (4) as it is. That is, if an LED is not lighted, the quantization error (here, the fractional part n6) carried over to the LED (here, the LED (3)) at the point in time is carried over to the adjacent LED (here, the LED (4)). Thus, occurrence of a correction error can be prevented. The next LED (4) is lighted because the image data is "1" (ON). At this time, in the LED (4), the correction value A4 and n6 carried over from the LED (3) are added and the lighting pulse width is corrected according to the first term of expression [1] mentioned above based on an integer part m7 of the addition result. Further, on the other hand, a fractional part n7 of the addition result is carried over as a quantization error when the next line of the LED (1) is lighted.

FIG. 10 shows the case where the quantization error is carried over from one pixel to another of the four pixels adjacent in the main scanning direction by way of example. However, the nearby LED to which the quantization error is carried over may be an LED within a predetermined range from the LED from which the quantization error is carried over (for example, pitch at which output unevenness can be visually recognized or less), and the quantization error can be carried over according to any of various carry-over patterns such that the quantization error is carried over, for example, between two LEDs adjacent in the main scanning direction.

In the image forming apparatus 1 of this exemplary embodiment, the initial light amount correction data Corr_1 stored in the EEPROM 102 and the light amount correction data Corr_3 resulting from adding the process light amount correction data Corr_2 stored in the EEPROM_A 301 and the initial light amount correction data Corr_1 are supplied to the signal generation circuit 100 by conducting data communications between the EEPROM 102 and the signal generation circuit 100, data communications between the EEPROM 102 and the control section 30, and further data communications between the control section 30 and the signal generation circuit 100 under the control of the control section 30 as described above. Accordingly, highly precise light amount correction of each of the LEDs arranged on the SLED 63 of the LPH 14 is made.

In the image forming apparatus 1 of this exemplary embodiment, the initial light amount correction data Corr_1 stored in the EEPROM 102 and the process light amount correction data Corr_2 stored in the EEPROM_A 301 are used. In addition, for example, the uneven density correction data Corr stored in the uneven density correction data section 112 can be once read out into the control section 30, which can then make a predetermined correction to the uneven density correction data Corr and then can again store the corrected uneven density correction data Corr in the uneven density correction data section 112, and light amount correction of each LED can be made based on the corrected uneven density correction data Corr.

For example, when an image formation element such as the charger 13 or the developing device 15 is replaced at the maintenance time, the gap between the photoconductor drum 12 and the image formation element may vary between one end (OUT side) and an opposite end (IN side). In this case, unevenness occurs in the image density between the one end (OUT side) and the opposite end (IN side) (IN-OUT unevenness in density). Then, for example, when any image formation element is replaced, the control section 30 once reads the uneven density correction data Corr stored in the uneven density correction data section 112 and corrects the uneven density correction data Corr based on the IN-OUT unevenness in density read through the image reader 3. The corrected uneven density correction data Corr can be again stored in the uneven density correction data section 112, and light amount correction corresponding to the IN-OUT unevenness in density read can be made.

Also in this case, the uneven density correction data Corr and the corrected uneven density correction data Corr are transmitted and received by conducting data communications between the control section 30 and the signal generation circuit 100.

Further, in the image forming apparatus 1 of this exemplary embodiment, the control section 30 supplies light amount adjustment data to the signal generation circuit 100. In the image forming apparatus 1, the toner image density may vary due to variation in the sensitivity characteristic of the photoconductor drum 12, variation in the latent image potential (dark part potential $V_H$ or light part potential $V_L$) caused by environmental change, etc., variation in the developing agent amount in the developing device 15, etc., for example. The light amount adjustment data is used to adjust the whole light amount in the LPH 14 (the light amount of the whole LEDs in the LPH 14) to deal with such variation and to maintain the toner image density at a given level. That is, the light amount adjustment data is output as a command signal to uniformly adjust the light amount of each LED in the SLED 63 of the LPH 14. Specifically, the light amount adjustment data indicates a setup value of the reference pulse width BASE in the first term of the expression [1] mentioned above and is formed as 10-bit data (0 to 1023), for example.

Such light amount adjustment data is also transmitted and received by conducting data communications between the control section 30 and the signal generation circuit 100.

The delay selection data and the lighting signal selection data stored in the EEPROM 102 are downloaded to the delay selection register 166 of the linearity correction section 162 when the power of the image forming apparatus 1 is turned on. At this time, data communications are also conducted between the control section 30 and the signal generation circuit 100.

By the way, the image forming apparatus 1 of this exemplary embodiment includes the fixing device 60 of electromagnetic induction heating type. The fixing device 60 of electromagnetic induction heating type has advantage in that the time to arrival at a fixable temperature (warm-up time) can be shortened, and is excellent in the on-demand property. On the other hand, the fixing device 60 of electromagnetic induction heating type involves increase in electromagnetic noise emitted from the fixing device 60 because a high-frequency current of 10 to 500 kHz is used, for example.

Figure 11:
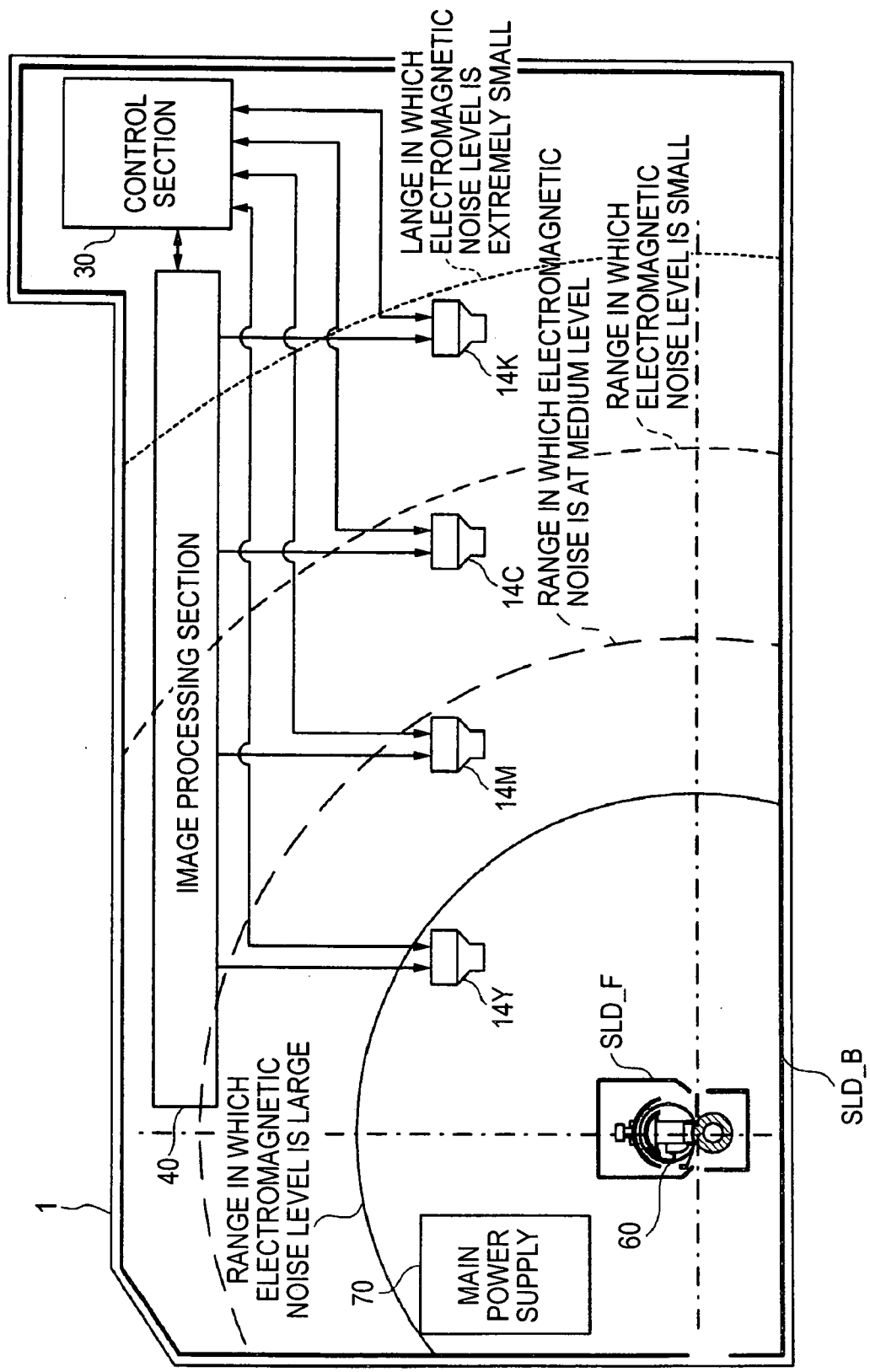
FIG. 11 is a drawing to show an electromagnetic shield formed in the image forming apparatus.

As a countermeasure against such electromagnetic noise, it is a common practice to cover the surroundings of the fixing device 60 with a fixing device shield SLD_F which is an electromagnetic shield, for example, as shown in FIG. 11 (a drawing to show the electromagnetic shield provided in the image forming apparatus 1). Further, the main body frame of the image forming apparatus 1 is formed as a main body shield SLD_B to provide an electromagnetic shield. Accordingly, leakage of electromagnetic noise to the outside of the image forming apparatus 1 is suppressed to an extremely small level.

However, the fixing device shield SLD_F cannot completely cover entrance and exit, for paper P, of the fixing device 60 in the image forming apparatus 1. Thus, leakage of electromagnetic noise from the fixing device 60 cannot be suppressed completely. Thus, since the generated noise level is particularly high in the fixing device 60 of electromagnetic induction heating type, electromagnetic noise leaking from the fixing device 60 in the image forming apparatus 1 may affect data communications between the EEPROM 102 and the signal generation circuit 100, data communications between the EEPROM 102 and the control section 30, and further data communications between the control section 30 and the signal generation circuit 100, which may cause a communication error to occur. That is, the initial light amount correction data Corr_1, the process light amount correction data Corr_2, the corrected uneven density correction data Corr, and the light amount adjustment data each involve a large amount of information. Therefore, the data communications require a long time. Particularly, for the high-resolution LPH 14, the data communications require a long time. Thus, there is high possibility that the electromagnetic noise leaked from the fixing device 60 causes a communication error.

If electromagnetic noise causes a communication error to occur, the initial light amount correction data Corr_1, the process light amount correction data Corr_2, the corrected uneven density correction data Corr, the light amount adjustment data, the delay selection data, and the lighting signal selection data are not accurately transmitted to the signal generation circuit 100. In this case, it is difficult to correct a light amount of each of the LEDs arranged on the SLED 63 of the LPH 14 with high accuracy. As a result, unevenness in density, etc., may be produced on an image, and the image quality may be degraded.

Then, the image forming apparatus 1 of this exemplary embodiment controls so as to conduct data communications between the EEPROM 102 and the signal generation circuit 100 in each LPH 14, data communications between the EEPROM 102 disposed in each LPH 14 and the control section 30, and further data communications between the control section 30 and the signal generation circuit 100 disposed in each LPH 14 when the electromagnetic noise falls below a predetermined level at which the electromagnetic noise does not cause a communication error to occur.

Figure 12:
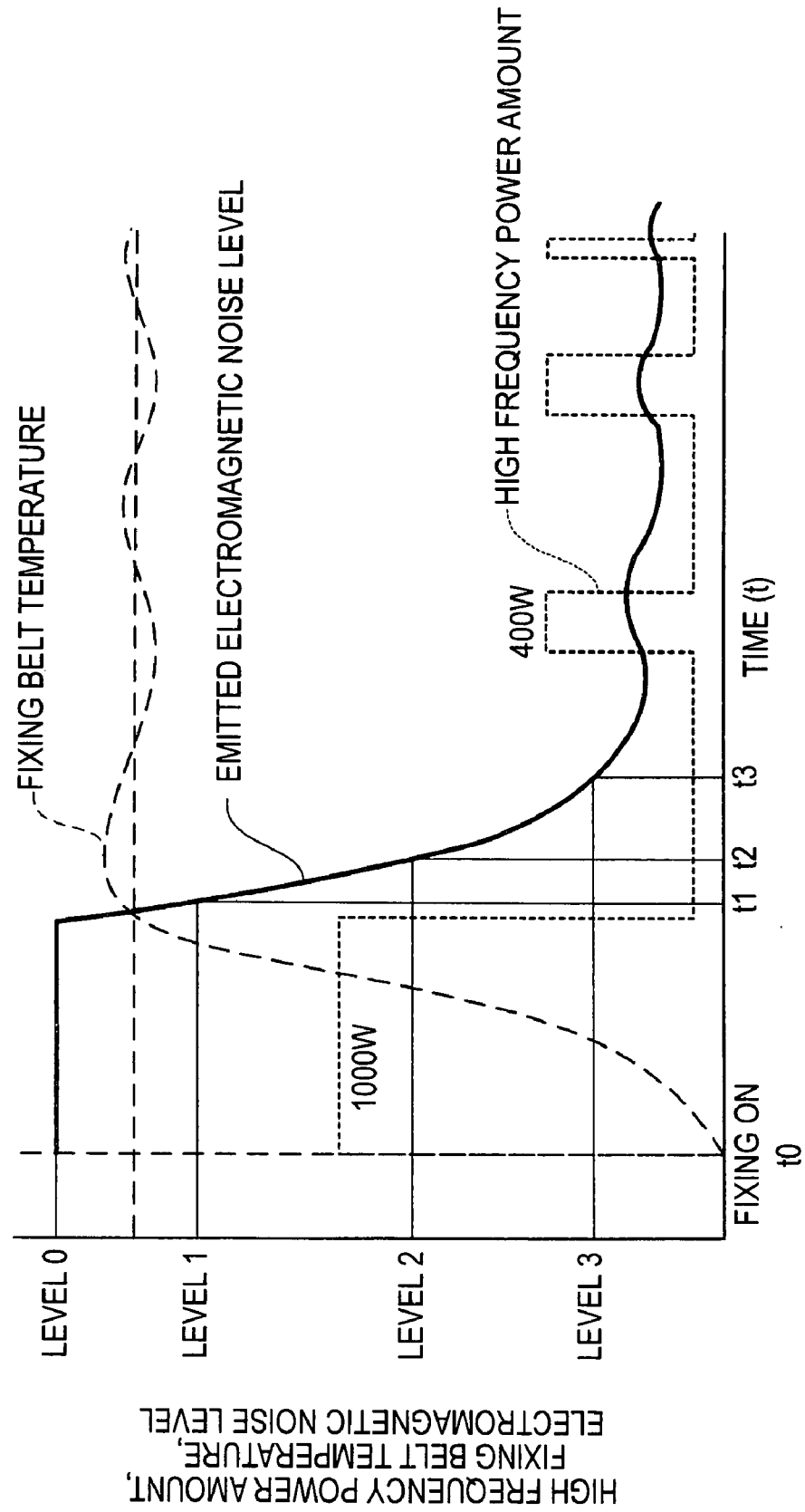
FIG. 12 is a drawing to show high frequency power amount and ON/OFF control of high-frequency current when the high-frequency current is supplied from an excitation circuit to an excitation coil in a fixing device by way of example and to show an outline of the electromagnetic noise level occurring at that time.

FIG. 12 is a drawing to show the power amount (high frequency power amount) and ON/OFF control of high-frequency current when high-frequency current is supplied from an excitation circuit (not shown) to an excitation coil (not shown) in the fixing device 60 by way of example and an outline of the electromagnetic noise level occurring at this time. The high-frequency current from the excitation circuit to the excitation coil is controlled by the control section 30 of the image forming apparatus 1 (see FIG. 1) based on the measurement value by the temperature sensor 66 for the fixing belt 61.

As shown in FIG. 12, in the image forming apparatus 1 of this exemplary embodiment, when the image processing section 40 receives image data from the external apparatus such as the PC 2 or the image reader 3, power supply to the fixing device 60 is started (fixing on: Time t0) from the viewpoint of the on-demand property of the fixing device 60. Then, to increase the temperature of the fixing device 60 in a short time, for example, a high-frequency current with 1000 W in power is supplied from the excitation circuit 65c to the excitation coil 65b. Accordingly, the temperature of the fixing belt 61 is increased rapidly. Power supply at 1000 W is continued until the fixing belt 61 reaches a fixing setup temperature. At this time, the level of electromagnetic noise emitted from the fixing device 60 becomes extremely large, and the electromagnetic noise leaked from the entrance or exit, for paper P, of the fixing device 60 becomes large. The level of the electromagnetic noise emitted from the fixing device 60 in a state where the high-frequency current with 1000 W in power is supplied is referred to as "level 0."

Then, when the fixing belt 61 reaches the fixing setup temperature, the high-frequency current with 1000 W in power is turned off, and the fixing device 60 makes a transition to a temperature adjustment period. Although the level of the electromagnetic noise lowers when the fixing device 60 makes a transition to the temperature adjustment period, an induced current remains in the excitation coil 65b. Thus, the level of the electromagnetic noise does not immediately lower to a predetermined value. The level of the electromagnetic noise becomes stable low when a predetermined time has elapsed since the fixing device 60 made a transition to the temperature adjustment period in which a high-frequency current with 400 W in power, for example, is turned on/off in response to the temperature of the fixing belt 61.

FIG. 11 shows an example of the magnitude of the electromagnetic noise in the image forming apparatus 1 in a state where 1000 W in power is supplied to the fixing device 60. The electromagnetic noise attenuates in inverse proportion to the square of the distance from the fixing device 60, which is the noise generation source. Thus, electromagnetic noise at a large level acts on the LPH 14Y of the image formation unit 11Y placed nearest to the fixing device 60, for example, in a state where 1000 W in power is supplied to the fixing device 60 and where the level of the generated electromagnetic noise from the fixing device 60 is the largest. Electromagnetic noise at a medium level acts on the LPH 14M of the image formation unit 11M placed the second nearest to the fixing device 60. Electromagnetic noise at a small level acts on the LPH 14C of the image formation unit 11C placed the third nearest to the fixing device 60. Electromagnetic noise at an extremely small level only acts on the LPH 14K of the image formation unit 11K, which is the most distant from the fixing device 60.

The expression "electromagnetic noise at an extremely small level" is used to mean electromagnetic noise at a level at which the possibility of causing a communication error to occur is extremely low if data communications are conducted.

Then, in the image forming apparatus 1 of this exemplary embodiment, when the image processing section 40 receives image data from the external apparatus such as the PC 2 or the image reader 3, only data communications between the EEPROM 102 and the signal generation circuit 100 in the LPH 14K, data communications between the EEPROM 102 disposed in the LPH 14K and the control section 30, and data communications between the control section 30 and the signal generation circuit 100 disposed in the LPH 14K are conducted under the control of the control section 30. In the LPH 14K, even if 1000 W in power is supplied to the fixing device 60, only electromagnetic noise at an extremely small level acts. Therefore, the possibility that a communication error will occur is extremely small if data communications are conducted.

Next, when the temperature control in the fixing device 60 makes a transition to the temperature adjustment period and the level of the electromagnetic noise emitted from the fixing device 60 becomes extremely small in the LPH 14C placed nearer to the fixing device 60 than the LPH 14K, data communications between the EEPROM 102 and the signal generation circuit 100 in the LPH 14C, data communications between the EEPROM 102 disposed in the LPH 14C and the control section 30, and further data communications between the control section 30 and the signal generation circuit 100 disposed in the LPH 14C are conducted. The level of the electromagnetic noise emitted from the fixing device 60, which becomes extremely small in the LPH 14C, will be referred to as "level 1." That is, data communications involved in the LPH 14C are started under the control of the control section 30 at time t1 at which the electromagnetic noise becomes level 1.

Next, when the level of the electromagnetic noise emitted from the fixing device 60 becomes extremely small in the LPH 14M placed nearer to the fixing device 60 than the LPH 14C, data communications between the EEPROM 102 and the signal generation circuit 100 in the LPH 14M, data communications between the EEPROM 102 disposed in the LPH 14M and the control section 30, and further data communications between the control section 30 and the signal generation circuit 100 disposed in the LPH 14M are conducted. The level of the electromagnetic noise emitted from the fixing device 60, which becomes extremely small in the LPH 14M, is referred to as "level 2." That is, data communications involved in the LPH 14M are started under the control of the control section 30 at time t2 at which the electromagnetic noise becomes level 2.

When the level of the electromagnetic noise emitted from the fixing device 60 becomes extremely small in the LPH 14Y placed nearest to the fixing device 60, data communications between the EEPROM 102 and the signal generation circuit 100 in the LPH 14Y, data communications between the EEPROM 102 disposed in the LPH 14Y and the control section 30, and further data communications between the control section 30 and the signal generation circuit 100 disposed in the LPH 14Y are conducted. The level of the electromagnetic noise emitted from the fixing device 60, which becomes extremely small in the LPH 14Y is referred to as "level 3." That is, data communications involved in the LPH 14Y are started under the control of the control section 30 at time t3 at which the electromagnetic noise becomes level 3.

Thus, in the image forming apparatus 1 of this exemplary embodiment, when the level of the electromagnetic noise emitted from the fixing device 60 becomes extremely small at the position where each LPH 14 is placed, data communications between the EEPROM 102 and the signal generation circuit 100 in the LPH 14, data communications between the EEPROM 102 disposed in the LPH 14 and the control section 30, and further data communications between the control section 30 and the signal generation circuit 100 disposed in the LPH 14 are conducted under the control of the control section 30. Accordingly, in each LPH 14, the initial light amount correction data Corr_1, the process light amount correction data Corr_2, the corrected uneven density correction data Corr, the light amount adjustment data, the delay selection data, and the lighting signal selection data are reliably transmitted to the signal generation circuit 100 without a communication error caused by electromagnetic noise.

In this case, the control section 30 may be placed at a distant position from the fixing device 60, which is the electromagnetic noise generation source, so as to be hard to receive the effect of the electromagnetic noise.

The time t at which the level of the electromagnetic noise emitted from the fixing device 60 becomes extremely small in each LPH 14 is previously found by measurement. The control section 30 stores, in the nonvolatile memory 304, the previously found times t (t1, t2, and t3) corresponding to the LPHs 14C, 14M, and 14Y, and controls the data communication start timing for each LPH 14.

In the image forming apparatus 1 of this exemplary embodiment, the data communication start timing is determined based on the distance between the fixing device 60, which is the electromagnetic noise generation source, and each LPH 14. Alternatively to such order, for example, the data communication start timing may also be determined based on the distance between (i) a position where disposed is the communication line for conducting data communications between the control section 30 and each LPH 14 and (ii) the fixing device 60. That is, as for data communications between the EEPROM 102 and the signal generation circuit 100 in the LPH 14, data communications between the EEPROM 102 disposed in the LPH 14 and the control section 30, and further data communications between the control section 30 and the signal generation circuit 100 disposed in the LPH 14, the start timing of data communications with the LPH 14 is determined based on whether or not the respective data communications easily receive the effect of the electromagnetic noise from the fixing device 60, which is the electromagnetic noise generation source. Accordingly, the data communication start timing can be set in response to the communication line wiring.

[Second Exemplary Embodiment]

In the description of the first exemplary embodiment, communications of various pieces of data for light amount correction are started in order in which the level of the electromagnetic noise emitted from the fixing device 60 becomes extremely small at the positions where disposed are the LPHs 14 provided in a one-to-one correspondence with the four image formation units 11 placed in parallel. A second exemplary embodiment of the invention provides the configuration in which communications of various pieces of data for light amount correction are started when the level of the electromagnetic noise emitted from a fixing device 60 becomes extremely small at the position where an LPH 14 is disposed in an image forming apparatus for forming a single-color image. Components similar to those of the first exemplary embodiment are denoted by similar reference numerals and will not be described again in detail.

Figure 13:
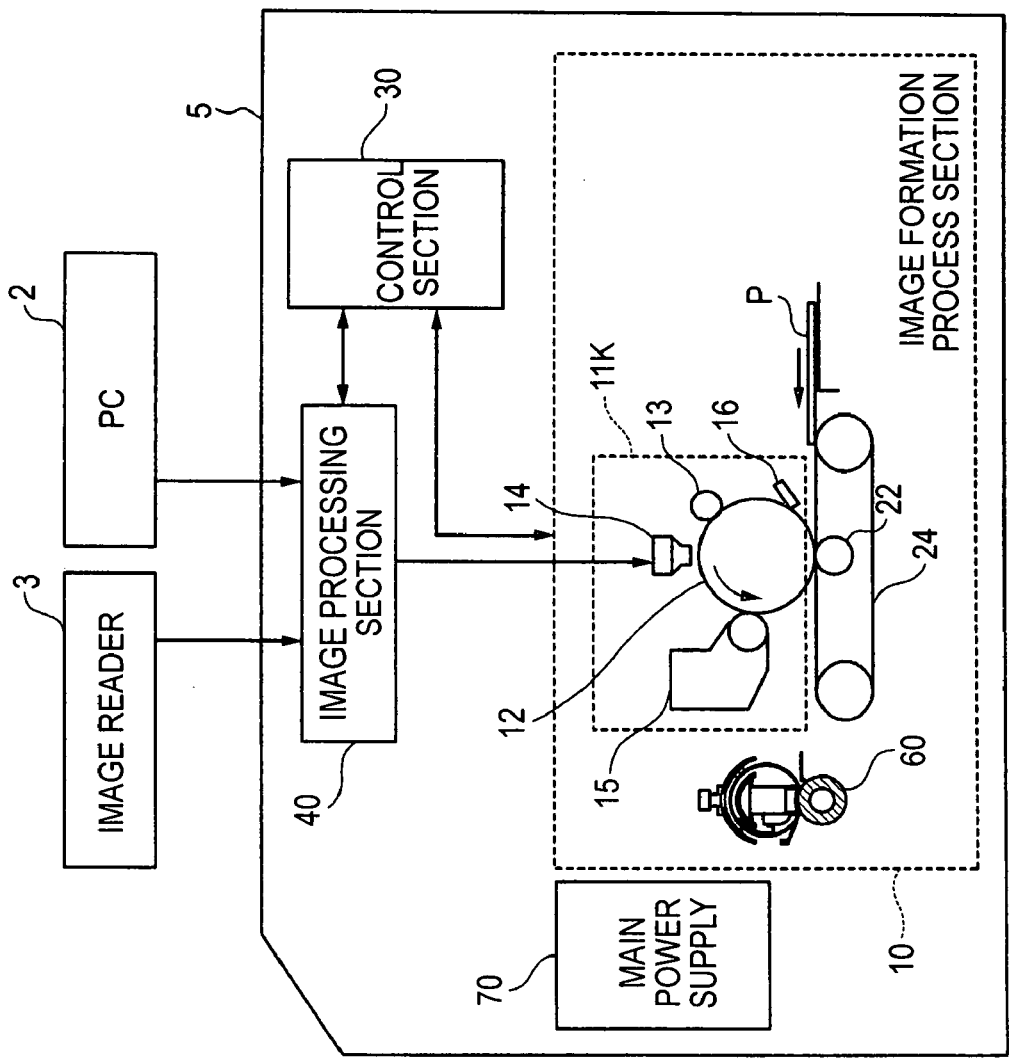
FIG. 13 is a drawing to show the general configuration of an image forming apparatus according to a second exemplary embodiment of the invention.

FIG. 13 is a drawing to show the general configuration of an image forming apparatus 5 of this exemplary embodiment. The image forming apparatus 5 shown in FIG. 13 includes an image formation unit 11K for forming a black (K) toner image, for example, in an image formation process section 10. The K color toner image formed in the image formation unit 11K is electrostatically attracted onto paper P held on a transfer belt 24 by a primary transfer roll 22 and is transferred to a fixing device 60. The unfixed toner image on the paper P transported to the fixing device 60 is fixed on the paper P as it undergoes fixing treatment using heat and pressure by the fixing device 60. Then, the paper P formed with the fixed image is transported to an ejected paper placement section (not shown) provided in an ejection section of the image forming apparatus 5.

In the image forming apparatus 5 of this exemplary embodiment, when an image processing section 40 receives image data from an external apparatus such as a PC 2 or an image reader 3, power supply to the fixing device 60 is started (fixing on: Time t0) from the viewpoint of the on-demand property of the fixing device 60. Then, as shown in FIG. 12 in the first exemplary embodiment, to increase the temperature of the fixing device 60 in a short time, for example, a high-frequency current with 1000 W is supplied from an excitation circuit 65c to an excitation coil 65b. Accordingly, the temperature of a fixing belt 61 is increased rapidly. The 1000-W power supply is continued until the fixing belt 61 reaches a fixing setup temperature. At this time, the level of electromagnetic noise emitted from the fixing device 60 becomes extremely large ("level 0") and the electromagnetic noise leaked from the entrance or the exit, for paper P, of the fixing device 60 becomes large.

Then, when the fixing belt 61 reaches the fixing setup temperature, the high-frequency current with 1000 W in power is turned off and the fixing device 60 makes a transition to a temperature adjustment period. Although the level of the electromagnetic noise lowers when the fixing device 60 makes a transition to the temperature adjustment period, an induced current remains in the excitation coil 65b. Thus, the level of the electromagnetic noise does not immediately lower to a predetermined value. The level of the electromagnetic noise becomes stable low when a predetermined time has elapsed since the fixing device 60 made a transition to the temperature adjustment period in which a high-frequency current with 400 W in power, for example, is turned on/off in response to the temperature of the fixing belt 61. Meanwhile, the electromagnetic noise emitted from the fixing device 60 lowers to "level 1," "level 2," "level 3," for example.

By the way, in the image forming apparatus 5 of this exemplary embodiment, at the position where the LPH 14 is placed, when the electromagnetic noise emitted from the fixing device 60 becomes a level at which the possibility that a communication error will occur is extremely small if data communications are conducted ("electromagnetic noise at extremely small level), data communications between EEPROM 102 and a signal generation circuit 100 in the LPH 14, data communications between the EEPROM 102 disposed in the LPH 14 and a control section 30, and further data communications between the control section 30 and the signal generation circuit 100 disposed in the LPH 14 are started.

Figure 14:
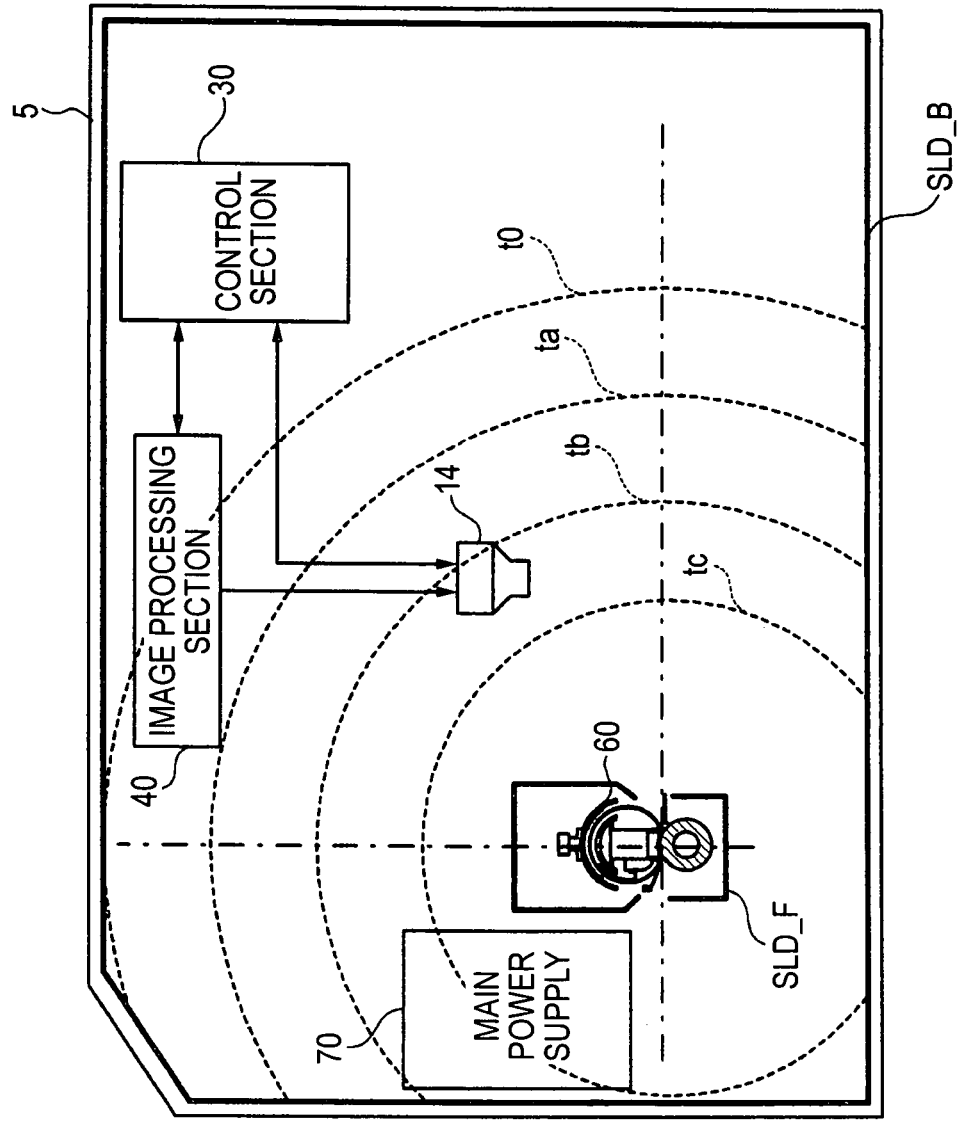

FIG. 14 is a drawing to show time change in the region where the electromagnetic noise level in the image forming apparatus 5 becomes extremely small after fixing on (time t0). As shown in the figure, at time 0, the electromagnetic noise level becomes extremely small in the region outside the region indicated by the outermost dashed line. The electromagnetic noise emitted from the fixing device 60 lowers with the passage of time from the fixing on from ta to tb to tc, and the range of the region where the electromagnetic noise level becomes extremely small widens gradually. That is, the dashed line indicating the boundary of the region where the electromagnetic noise level becomes small narrows to the fixing device 60 side. For example, when the time from the fixing on becomes tb, the electromagnetic noise level becomes extremely small at the position where the LPH 14 is placed.

Then, in the image forming apparatus 5 of this exemplary embodiment, when the time from the fixing on becomes tb, data communications between the EEPROM 102 and the signal generation circuit 100 in the LPH 14, data communications between the EEPROM 102 disposed in the LPH 14 and the control section 30, and further data communications between the control section 30 and the signal generation circuit 100 disposed in the LPH 14 are conducted.

The time tb at which the level of the electromagnetic noise emitted from the fixing device 60 becomes extremely small in the LPH 14 is previously found by measurement. The control section 30 stores the previously found time tb corresponding to the LPH 14 and controls the data communication start timing in the LPH 14.

Since setting of the time tb at which data communications with the LPH 14 are started can be easily changed by software, it can also be changed so as to deal with various situation changes at once.

What is claimed is:

1. An image forming apparatus comprising:
a light emission element that exposes an image carrier to light;
a lighting signal generation section that generates a lighting signal for lighting the light emission element;
a storage section that stores data which is used when the lighting signal generation section generates the lighting signal;
a communication line through which the lighting signal generation section and the storage section transmit and receive the data therebetween;
a control section that controls the transmitting and receiving of the data between the lighting signal generation section and the storage section; and
an electromagnetic noise generation source that generates electromagnetic noise, wherein
the control section controls so as to start the transmitting and receiving of the data
when a magnitude of the electromagnetic noise generated by the electromagnetic noise generation source in a power on status, at a position where the lighting signal generation section or the communication line is disposed, is decreased to be smaller than a predetermined value.

2. The apparatus according to claim 1, wherein the storage section stores light amount correction data which is used to correct a light emission amount of the light emission element, as the data.

3. The apparatus according to claim 1, wherein:
the electromagnetic noise generation source comprises a fixing device including a heating member subjected to electromagnetic induction heating by a high-frequency current, and
the control section controls so as to start the transmitting and receiving of the data in a state where the magnitude of the electromagnetic noise generated by the fixing device becomes smaller than the predetermined value (i) at the position where the lighting signal generation section is disposed or (ii) at the position where the communication line is disposed, due to decrease in (a) a power amount of the high-frequency current supplied to the heating member of the fixing device or (b) a supply time period for which the high-frequency current is supplied to the heating member.

4. The apparatus according to claim 3, wherein
the control section stores a time from when the high-frequency current is supplied to the fixing device till when the magnitude of the electromagnetic noise generated by the fixing device becomes smaller than the predetermined value, and
the control section sets, based on the stored time, a timing when the transmitting and receiving of the data is started.

5. An image forming apparatus comprising:
a plurality of image carriers;
a plurality of light emission element members that are provided so as to correspond to the respective image carriers, each light emission element member comprising a plurality of light emission elements that are arranged in a row and that exposes the corresponding image carrier to light;
a plurality of lighting signal generation sections that are provided so as to correspond to the respective light emission element members, wherein each light signal generation section generates a lighting signal for lighting the plurality of light emission elements of the corresponding light emission element members;
a storage section that stores light amount correction data to correct light emission amounts of the light emission elements, the light amount correction data that are used when the plurality of lighting signal generation sections generate the lighting signals; and a control section that controls transmitting and receiving of the light amount correction data between the plurality of lighting signal generation sections and the storage section, wherein:

the control section controls so as to start the transmitting and receiving the light amount correction data between the plurality of lighting signal generation sections and the storage section in a predetermined order such that magnitudes of electromagnetic noise generated by an electromagnetic noise generation source in a power on status is decreased to be smaller than a predetermined value under a certain circumstance.

6. The apparatus according to claim 5, wherein the control section controls so as to start the transmitting and receiving of the light amount correction data between the lighting signal generation sections and the storage section in order in which the magnitudes of electromagnetic noise at positions where the lighting signal generation sections are disposed become smaller than the predetermined value.

7. The apparatus according to claim 5, wherein:
the control section controls so as to start the transmitting and receiving of the light amount correction data between the lighting signal generation sections and the storage section in order in which the magnitudes of electromagnetic noise at positions where communication lines connected to the light signal generation sections are disposed become smaller than the predetermined value, and
each lighting signal generation section and the storage section transmit and receive the light amount correction data therebetween through the corresponding communication line.

8. The apparatus according to claim 5, wherein:
the control section controls so as to start the transmitting and receiving of the light amount correction data between the lighting signal generation sections and the storage section in descending order of distances between the electromagnetic noise generation source and the lighting signal generation sections.

9. The apparatus according to claim 5, wherein:
the control section controls so as to start the transmitting and receiving of the light amount correction data between the lighting signal generation sections and the storage section in descending order of distances between the electromagnetic noise generation source communication lines connected to the lighting signal generation sections, and
each lighting signal generation sections and the storage section transmit and receive the light amount correction data therebetween through the corresponding communication line.

10. The apparatus according to claim 5, wherein:
the storage section comprises a plurality of storage sections corresponding to the respective lighting signal generation sections,
to each light emission element member, and the storage section that stores the light amount correction data used when the lighting signal generation section generates the lighting signal and that correspond to the lighting signal generation section are disposed on a single board, and
the control section controls so as to start the transmitting and receiving of the light amount correction data between the lighting signal generation sections and the storage sections, which are disposed on the respective boards, in descending order of distances between the electromagnetic noise generation source and the boards.

11. The apparatus according to claim 5, further comprising:
a fixing device including a heating member subjected to electromagnetic induction heating by a high-frequency current, wherein:
the control section controls so as to start the transmitting and receiving of the light amount correction data between the lighting signal generation sections and the storage section in order in which the magnitudes of electromagnetic noise, at positions where the lighting signal generation sections are disposed, generated by the fixing device become smaller than a predetermined value.

12. The apparatus according to claim 5, further comprising:
a fixing device including a heating member subjected to electromagnetic induction heating by a high-frequency current, wherein:
the control section controls so as to start the transmitting and receiving of the light amount correction data between the lighting signal generation sections and the storage section in order in which the magnitudes of electromagnetic noise, at positions where communication lines connected to the light signal generation sections are disposed, generated by the fixing device become smaller than a predetermined value, and
each lighting signal generation section and the storage section transmit and receive the light amount correction data therebetween through the corresponding communication line.

13. A control device comprising:
a control section that controls transmitting and receiving of light amount correction data between each of a plurality of lighting signal generation devices and a storage device, wherein each lighting signal generation device generates a lighting signal for lighting a light emission element, the storage device stores the light amount correction data to correct light emission amounts of the light emission elements, and the light amount correction data is used when each lighting signal generation device generates the lighting signal; and
a storage section that stores standby time indicating until when the transmitting and receiving of the light amount correction data between each lighting signal generation device and the storage device is started, wherein
when each lighting signal generation device generates the lighting signal, the control section acquires the standby times from the storage section and controls so as to start the transmitting and receiving of the light amount correction data between each lighting signal generation device and the storage device in order after expiration of the corresponding standby time,
wherein the storage section stores the standby time which is set based on (i) distances between an electromagnetic noise generation source for generating electromagnetic noise and the lighting signal generation devices or (ii) distances between the electromagnetic noise generation source and communication lines through which the lighting signal generation devices and the storage device transmit and receive the light amount correction data therebetween.

14. The device according to claim 13, wherein the electromagnetic noise generation source comprises a fixing device including a heating member subjected to electromagnetic induction heating by a high-frequency current.

15. A non transitory computer readable medium storing a program causing a computer to execute a process for controlling an image forming apparatus, the process comprising:

acquiring standby time indicating until when transmitting and receiving of light amount correction data between each of a plurality of lighting signal generation devices and a storage device, wherein each lighting signal generation device generate a lighting signal for lighting a light emission element, the storage device stores the light amount correction data to correct light emission amounts of the light emission elements, and the light amount correction data is used when each lighting signal generation device generates the lighting signal; and controlling so as to start the transmitting and receiving of the light amount correction data between each lighting signal generation device and the storage device in order after expiration of the acquired corresponding standby time when each lighting signal generation device generates the lighting signal, wherein the storage section stores the standby time which is set based on (i) distances between an electromagnetic noise generation source for generating electromagnetic noise and the lighting signal generation devices or (ii) distances between the electromagnetic noise generation source and communication lines through which the lighting signal generation devices and the storage device transmit and receive the light amount correction data therebetween.

16. An image forming apparatus comprising:

a light emission element that exposes an image carrier to light;

a lighting signal generation section that generates a lighting signal for lighting the light emission element;

a storage section that stores data which is used when the lighting signal generation section generates the lighting signal;

a communication line through which the lighting signal generation section and the storage section transmit and receive the data therebetween;

a control section that controls the transmitting and receiving of the data between the lighting signal generation section and the storage section; and an electromagnetic noise generation source that generates electromagnetic noise, wherein the electromagnetic noise generation source comprises a fixing device including a heating member subjected to electromagnetic induction heating by a high-frequency current, wherein the control section controls so as to start the transmitting and receiving of the data when the magnitude of the electromagnetic noise generated by the fixing device at the position where the lighting signal generation section or the communication line is disposed, becomes smaller than the predetermined value due to decrease in (a) a power amount of the high-frequency current supplied to the heating member of the fixing device or (b) a supply time period for which the high frequency current is supplied to the heating member.

\* \* \* \* \*